(12) United States Patent
Namjoshi et al.

(10) Patent No.: US 10,123,040 B2
(45) Date of Patent: Nov. 6, 2018

(54) INTRA-CODED VIDEO FRAME CACHING FOR VIDEO TELEPHONY SESSIONS

(71) Applicant: QUALCOMM Incorporated, San Diego, CA (US)

(72) Inventors: Aditya Namjoshi, San Diego, CA (US); Harish Bhandiwad, San Diego, CA (US); Clayton Wong, San Diego, CA (US); Neeraj Gaur, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/251,997

(22) Filed: Aug. 30, 2016

(65) Prior Publication Data
US 2018/0063548 A1  Mar. 1, 2018

(51) Int. Cl.
| | | |
|---|---|---|
| *H04N 19/44* | (2014.01) | |
| *H04N 19/105* | (2014.01) | |
| *H04N 19/577* | (2014.01) | |
| *H04W 88/02* | (2009.01) | |
| *H04L 29/06* | (2006.01) | |
| *H04L 29/08* | (2006.01) | |
| *H04N 7/14* | (2006.01) | |

(52) U.S. Cl.
CPC ....... *H04N 19/577* (2014.11); *H04L 65/1059* (2013.01); *H04L 65/604* (2013.01); *H04L 65/80* (2013.01); *H04L 67/2842* (2013.01); *H04N 19/105* (2014.11); *H04N 19/44* (2014.11); *H04N 7/147* (2013.01); *H04W 88/02* (2013.01)

(58) Field of Classification Search
None
See application file for complete search history.

(56) References Cited

U.S. PATENT DOCUMENTS 6,137,912 A * 10/2000 Kostrzewski ........ H04N 19/597
    348/388.1
6,985,188 B1    1/2006 Hurst, Jr.
(Continued)

FOREIGN PATENT DOCUMENTS

EP       1766981 A1    3/2007

OTHER PUBLICATIONS

Wenger et al., "Codec Control Message in the RTP Audio-Visual Profile with Feedback (AVPF)", Network Working Group, Feb. 2008, pp. 1-64. (Year: 2008).*

(Continued)

*Primary Examiner* — Reza Aghevli
(74) *Attorney, Agent, or Firm* — Shumaker & Sieffert, P.A.

(57) ABSTRACT

Video telephony (VT) call management techniques are described. The techniques enable a device to cache intra-frame data at a pre-decoder-initialization stage. An example device includes a memory configured to store video data associated with a VT call, a video decoder configured to render a portion of the stored video data; and one or more processors. The processor(s) are configured to determine whether the received video frame data comprises i-frame data, to determine whether the video decoder is in a pre-initialized state or an initialized state, and when the received video frame data comprises the i-frame data and the video decoder is in the pre-initialized state, to store the i-frame data to the memory.

30 Claims, 6 Drawing Sheets

(56) References Cited

U.S. PATENT DOCUMENTS

| | | | |
|---|---|---|---|
| 7,421,129 B2 | 9/2008 | Lee et al. | |
| 8,366,552 B2 | 2/2013 | Perlman et al. | |
| 9,237,387 B2 | 1/2016 | Bocharov et al. | |
| 9,654,405 B2* | 5/2017 | Yang | H04L 47/32 |
| 2004/0181813 A1 | 9/2004 | Ota et al. | |
| 2005/0207449 A1* | 9/2005 | Zhang | H04L 29/06027 |
| | | | 370/486 |
| 2007/0206673 A1* | 9/2007 | Cipolli | H04L 1/1607 |
| | | | 375/240.1 |
| 2007/0296854 A1* | 12/2007 | Berkey | H04N 19/172 |
| | | | 348/412.1 |
| 2010/0167809 A1* | 7/2010 | Perlman | A63F 13/12 |
| | | | 463/24 |
| 2010/0208850 A1* | 8/2010 | Anderson | H04L 20/16 |
| | | | 375/340 |
| 2011/0105226 A1* | 5/2011 | Perlman | A63F 13/12 |
| | | | 463/30 |
| 2013/0279882 A1* | 10/2013 | Singer | H04N 19/70 |
| | | | 386/241 |
| 2015/0189235 A1* | 7/2015 | Oike | H04L 65/604 |
| | | | 348/14.07 |
| 2015/0244650 A1* | 8/2015 | Yang | H04N 21/44209 |
| | | | 348/180 |
| 2016/0142330 A1* | 5/2016 | Yang | H04L 47/32 |
| | | | 370/231 |
| 2016/0226939 A1* | 8/2016 | Kwak | H04L 65/4076 |
| 2017/0239566 A1* | 8/2017 | Perlman | H05K 999/99 |
| 2017/0272691 A1* | 9/2017 | Song | H04N 7/08 |
| 2017/0373776 A1* | 12/2017 | Lee | H04H 20/72 |
| 2017/0373918 A1* | 12/2017 | Kwak | H04L 29/0809 |
| 2017/0374429 A1* | 12/2017 | Yang | H04N 21/4882 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wenger et al., "Codec Control Messages in the RTP Audio-Visual Profile with Feedback (AVPF)," RFC 5104, Network Working Group, Feb. 2008, pp. 1-64.

Schulzrinne et al., "RTP: A Transport Protocol for Real-Time Applications," RFC 3550, Network Working Group, Jul. 2003, pp. 1-105.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

International Search Report and Written Opinion—PCT/US2017/039578—ISA/EPO—Sep. 15, 2017, 16 pp.

Wenger, S., et al., "Extended RTP Profile for Real-time Transport Control Protocol (RTCP)-Based Feedback (RTP/AVPF)," RFC4585, IETF Standard, Internet Engineering Task Force, IETF, CH,Ott Helsinki University of Technology, Jul. 1, 2006 (Jul. 1, 2006), XP015055018, ISSN: 0000-0003 abstract p. 31, paragraph 6—p. 41, 53 pp.

Response to Written Opinion dated Sep. 15, 2017, from International Application No. PCT/US2017/039578, filed on Jan. 30, 2018, 23 pp.

International Preliminary Report on Patentability from International Application No. PCT/US2017/039578, dated Jun. 13, 2018, 23 pp.

* cited by examiner

US 10,123,040 B2

INTRA-CODED VIDEO FRAME CACHING FOR VIDEO TELEPHONY SESSIONS

TECHNICAL FIELD

This disclosure relates to the processing of video data in video telephony (VT) sessions.

BACKGROUND

Video telephony (VT) involves the real-time communication of packets carrying audio and video data. A VT device may include a video encoder that obtains video from a video capture device, such as a video camera or video archive, and generates video packets. Similarly, an audio encoder in a VT device may obtain audio from an audio capture device, such as a microphone or speech synthesizer, or an audio archive, and generate audio packets. The video packets and audio packets may be placed in a radio link protocol (RLP) queue. A medium access control (MAC) layer unit may generate medium access control (MAC) layer packets from the contents of the RLP queue. The MAC layer packets may be converted to physical (PHY) layer packets for transmission across a communication channel to another VT device. Video packets used for VT sessions generally conform to real-time transport protocol (RTP). A video decoder within the VT device decodes the video data for presentation to a user via a display device. An audio decoder within the VT device decodes the audio data for output via an audio speaker. VT sessions are often carried out over an Internet protocol multimedia subsystem (IMS) network. In some instances, a VT device may be a receiver device, in that the receiver device implements video and audio decoding functionalities and outputs the decoded data, but does not encode video and audio data for transmission over the VT call.

VT devices also may be referred to as user equipment (UE). Two or more UEs may be used in a given VT session or "VT call." In mobile VT applications, a receiving UE may be a wireless communication device that receives the physical layer packets via a wireless forward link (FL) (or "downlink") from a base station to the receiving UE as a wireless terminal. A sending UE transmits the PHY layer packets via a wireless reverse link (RL) (or "uplink") to a base station. Each UE includes PHY and MAC layers to convert the received PHY and MAC layer packets and reassemble the packet payloads into audio packets and video packets.

VT applications generally use a combination of intra-predicted video frames (i-frames), inter-predicted video frames (p-frames), and optionally, bidirectionally-predicted video frames (b-frames) to provide a video stream. I-frames represent full pictures. P-frames represent information that indicates differences (or so-called "delta" information) between two pictures, namely, a current picture and another pictures, such as the most recent i-frame in output order. B-frames represent delta information between two pictures, namely, a current picture, and two other pictures, such as the most recent past i-frame in output order, and the next i-frame in output order. Thus, an i-frame includes a greater amount of data than a p-frame or a b-frame. In other words, an i-frame is more "data-rich" than a p-frame or a b-frame.

A sending UE may transmit i-frames at predetermined time intervals during a VT call. During the time interval between transmission of two consecutive i-frames, the sending UE may transmit p-frames, which represent progressive deltas with respect to the previously-transmitted i-frame. In turn, each p-frame that follows the i-frame represents delta information with respect to the previously-transmitted i-frame. Each b-frame that follows the i-frame includes delta information with respect to the previously-generated i-frame and subsequent i-frame that follows the b-frame in output order. In this way, the sending UE may transmit a video stream at a given frame rate, while mitigating bandwidth consumption by using fewer data-rich i-frames. While reference pictures are described as being i-frames as an example, it will be appreciated that, in various instances, a reference picture may be a p-frame or a b-frame. That is, in such examples, the sending UE may further conserve bandwidth by signaling prediction frames (e.g., p-frames or b-frames) that provide delta information with respect to the reconstructed versions of other prediction frames (e.g., reconstructed p-frames or b-frames).

A receiving UE may receive a VT packet flow from one or more sending UEs. The video decoder of the receiving UE may reconstruct a received i-frame to render an image at an instance of time. In turn, the video decoder of the receiving UE may reconstruct subsequent frames of the video stream by applying the delta information of the p-frames and/or b-frames that follow the reconstructed i-frame in the received VT packet flow. The video decoder may continue to construct the video stream using progressive p-frames until a new i-frame is received for that particular packet flow. Upon receiving a new i-frame, the video decoder of the receiving UE may restart the process of constructing a subsequent series of pictures by applying the delta information of later-received p-frames and/or b-frames. In this way, VT applications enable UEs to support VT sessions while conserving bandwidth through the combined use of i-frames, p-frames, and b-frames.

SUMMARY

In an example, this disclosure is directed to a method of processing video data associated with a video telephony (VT) call. The method includes receiving, at a device, video frame data over a communications channel, and determining, by the device, whether the received video frame data includes i-frame data. The method further includes determining, by the device, whether a video decoder of the device is in a pre-initialized state or an initialized state, and, when the received video frame data is determined to include the i-frame data and the video decoder is determined to be in the pre-initialized state, storing, by the device, the i-frame data to a buffer based on the determinations.

In another example, this disclosure is directed to a device for processing data. The device includes a memory configured to store associated with a video telephony (VT) call, a video decoder configured to decode at least a portion of the stored video data, and one or more processors for processing the stored video data and operating the video decoder. The one or more processors are configured to receive video frame data over a communications channel, to determine whether the received video frame data comprises i-frame data, and to determine whether the video decoder is in a pre-initialized state or an initialized state. The one or more processors are configured to store, when the received video frame data is determined to comprise the i-frame data and the video decoder is determined to be in the pre-initialized state, the i-frame data to the memory based on the determinations.

In another example, this disclosure is directed to an apparatus for processing video data associated with a video telephony (VT) call. The apparatus includes means for receiving video frame data over a communications channel, and means for determining whether the received video frame data comprises i-frame data. The apparatus further includes means for determining whether a video decoder of the apparatus is in a pre-initialized state or an initialized state, and means for storing, when the received video frame data is determined to comprise the i-frame data and the video decoder is determined to be in the pre-initialized state, the i-frame data to a buffer based on the determinations.

In another example, this disclosure is directed to a non-transitory computer-readable medium is encoded with instructions that, when executed, cause one or more processors of a device to receive video frame data over a communications channel, to determine whether the received video frame data comprises i-frame data, to determine whether a video decoder of the device is in a pre-initialized state or an initialized state, and to store, when the received video frame data is determined to comprise the i-frame data and the video decoder is in the pre-initialized state, the i-frame data to a buffer based on the determinations.

The details of one or more examples of the disclosure are set forth in the accompanying drawings and the description below. Other features, objects, and advantages will be apparent from the description, drawings, and the claims.

DETAILED DESCRIPTION

Figure 1:
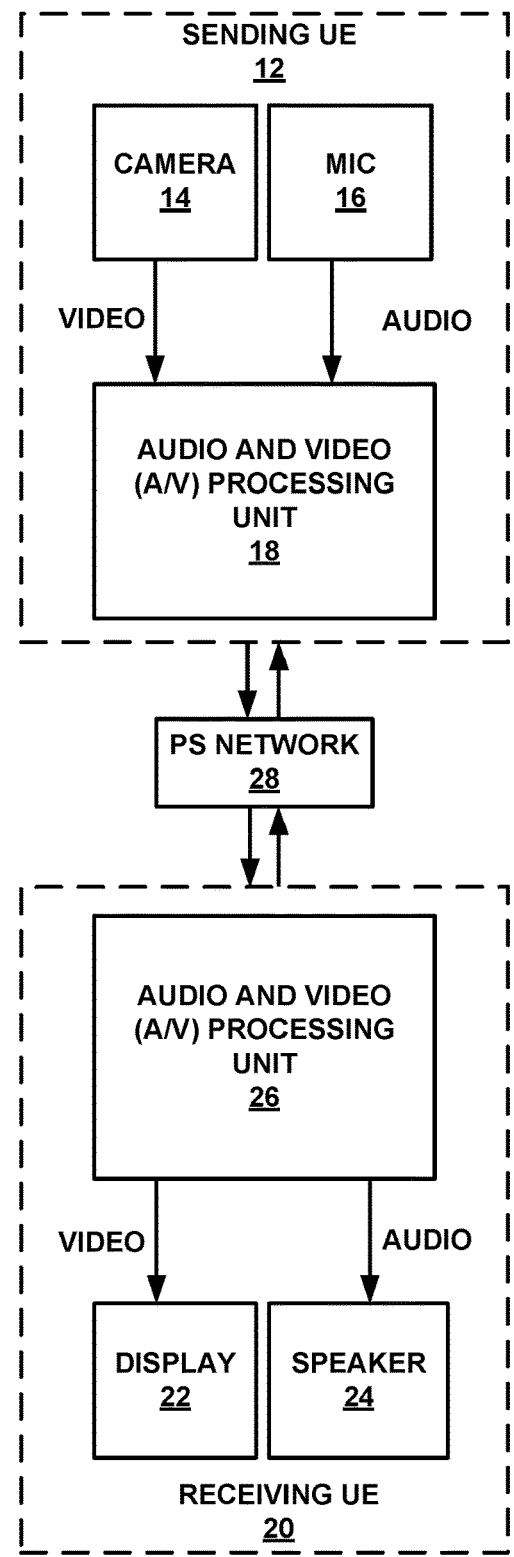
FIG. 1 is a block diagram illustrating two devices in a video telephony (VT) system participating in a VT call, consistent with techniques of this disclosure.

Video telephony (VT) devices, also referred to as user equipment (UE), may be connected via a wired or wireless network for conducting a VT session or VT call (e.g., transmission of audio and/or video data between the UEs). A UE that is processing audio and/or video data for transmission to another UE may be referred to herein as a "sending UE" or a "sender device." A UE that processes received audio and/or video data (e.g., for presentation to a user) may be referred to as a "receiving UE" or a "receiver device." A single UE typically functions as both a sender device and a receiver device when participating in a two-way VT call or a VT call that includes three or more UEs.

During a VT call, a sending UE encodes video data by generating intra-predicted i-frames at predetermined time intervals. In the interim time between generating two consecutive i-frames, the sending UE generates one or more inter-predicted p-frames and/or b-frames. The p-frames and/or b-frames provide delta information with respect to one or more other frames, such as the last-generated i-frame. In the case of b-frames, each b-frame provides delta information of the last-generated i-frame and a next i-frame in output order. In one use case scenario, the video stream may represent a moving car. In this example, an i-frame may represent the car and its then-current background. For instance, a p-frame or b-frame that follows the i-frame may provide delta information that describes the change in the background of the i-frame, while maintaining the image of the car in the foreground. In the case of a b-frame, the b-frame may also leverage data of a next i-frame, in which the background may have changed to an even greater extent. While a background scene change is described for purposes of discussion, it will be appreciated that a p-frame or b-frame may, in certain cases, represent delta information with respect to foreground objects of the image (in this particular example, the car) as well.

In various examples, the sending UE may generate video frames according to any number of audio and video compression standards, such as the ITU-T H.264 standard, alternatively referred to as MPEG-4, Part 10, Advanced Video Coding (AVC), or the High Efficiency Video Coding (HEVC) standard, sometimes called the H.265 standard. The sending UE may continue to generate a progressive sequence of p-frames until the sending UE generates another i-frame. The number of i-frames generated within a fixed time is referred to herein as a "sampling rate" or a "refresh rate." The number of frames (regardless of i-frame, p-frame, or b-frame designation) generated within a fixed time is referred herein as a "frame rate."

The sending UE may generate a new i-frame in response to various types of stimuli. In one example, the sending UE may proactively generate a new i-frame based on determining that a predetermined amount of time has passed since the sending UE generated the previous i-frame, i.e., according to a prescribed refresh rate. In another example, the sending UE may reactively generate a new i-frame in response to receiving an i-frame instigating communication from a remote UE, i.e., a communication from a remote, receiving UE that requests of otherwise prompts the sending of the i-fame. For instance, the sending UE may receive one or both of a picture loss indication (PLI) message request or a full intra-frame request (FIR) message. For ease of discussion purposes, the term "PLI/FIR" is used to denote either a PLI or FIR message, or a combination of a PLI and an FIR message.

If the sending UE receives a PLI/FIR, the sending UE determines that the remote UE that generated the PLI/FIR requires a new i-frame in order to refresh, initiate, or reinstate the video stream corresponding to the video data generated by the sending UE. In response to receiving a PLI/FIR, the sending UE may invoke its video encoder to generate a new i-frame, or may retrieve a pre-encoded, archived i-frame. In turn, the sending UE may transmit the newly-generated i-frame to the remote UE that originated the PLI/FIR, and optionally, to other remote UEs in the VT call.

From the perspective of a receiving UE, the receiving UE may detect the start of the video stream of a VT call upon receiving frames (e.g., an i-frame, a p-frame, a b-frame, or an initial i-frame followed by one or more p-frames and/or b-frames) from a remote UE. In turn, the receiving UE may initialize its video decoder, in order to use the video decoder to decode and render the video stream(s) of the VT call. The video decoder of a receiving UE needs to be initialized in order to render a video stream of a VT call. As part of, or in conjunction with the decoder initialization, the video decoder of the receiving UE may discard the previously-received frames. Thus, upon initialization, the video decoder may not have a previous i-frame available for immediate rendering using any incoming p-frames and/or b-frames. Instead, the video decoder does not begin rendering the video stream until the receiving UE receives another i-frame subsequent to the completion of decoder initialization. For instance, the receiving UE may receive a "fresh" i-frame, in that the newly-received i-frame represents an i-frame that has been signaled only once at the time when the receiving UE receives the i-frame. As examples, the video decoder of the receiving UE may await the transmission of a fresh i-frame that the sending UE generates upon expiration of the predetermined time period, or the receiving UE may invoke a new i-frame by transmitting a PLI/FIR to the sending UE.

As such, the video stream of a VT may have a delay with respect to the corresponding audio data. For instance, because the receiving UE relies on the first i-frame received after decoder initialization to begin constructing the video frame, the video decoder does not render any video data during the time between completing decoder initialization and receiving the i-frame. In many use case scenarios, the delay between the start of the VT call and the beginning of video rendering may range from three to ten seconds. In other use case scenarios, the delay time may fall outside the three-to-ten second range, such as in the zero-to-three second range, or greater than ten seconds.

Techniques of this disclosure relate to enhancements for rendering VT sessions. To initiate a VT call, the sending UE begins transmitting frames to the receiving UE. Upon detecting the frames received from the sending UE, the receiving UE performs decoder initialization. Decoder initialization refers to the process by which the video decoder of a receiving UE is prepared for rendering of frames received as part of a particular VT call.

The video decoder may discard all frames that are received prior to completion of the decoder initialization process. The now-initialized decoder may begin the process of rendering the video stream of the VT call upon receipt of a new i-frame. For instance, the decoder may render the next received i-frame to output an image via a display of the receiving UE. In turn, the video decoder may apply subsequently-received p-frames and/or b-frames to reconstruct and render subsequent images of the stream, until the receiving UE receives another i-frame.

At the time that decoder initialization is completed at a receiving UE, the video decoder does not have an i-frame available. Because the video decoder discards all pre-initialization frames as part of decoder initialization, the video decoder discards the first-received i-frame that was used to initiate the current VT call. Moreover, the video decoder also discards any subsequently-received i-frames if those i-frames were received prior to completion of the decoder initialization process. Thus, the video decoder cannot render images using any p-frames and/or b-frames received after decoder initialization, because the video decoder does not have an i-frame to which to apply the delta information of such p-fames. Instead, the video decoder may need to wait until the receipt of a new i-frame for the video decoder to begin rendering images of the video stream. Thus, the receiving UE typically begins rendering the video stream at a later time than the corresponding audio stream. Thus, the video component is "delayed" with respect to the VT call as a whole.

The techniques of this disclosure provide one or more potential enhancements over existing VT technology. For instance, by caching the last i-frame that was received before completion of decoder initialization, the receiving UE may begin rendering video data with a reduced delay time, or even with no delay time, potentially. Moreover, by caching a pre-initialization i-frame, the receiving UE may reduce network congestion and bandwidth consumption by obviating the need to transmit a request for a fresh i-frame after decoder initialization. Additionally, the receiving UE may mitigate bandwidth wastage, because the receiving UE makes use of p-frames and/or b-frames received after decoder initialization, rather than discarding the received p-frames and/or b-frames until a new i-frame is received.

Techniques of this disclosure enable a receiving UE to cache an i-frame that is received by the receiving UE, and from the sending UE, before completion of decoder initialization. By caching an i-frame received before decoder initialization is completed, the receiving UE enables the decoder to begin rendering the video stream shortly or potentially immediately after decoder initialization is completed, instead of presenting further delay between completion of decoder initialization and video presentation. Because the video decoder has access to an i-frame when initialization is complete, the video decoder may be able to render the i-frame to output an image of the video stream. Moreover, the video decoder may be able to apply the first p-frame or b-frame received after initialization, thereby beginning the moving picture sequence of the video stream. In this manner, the techniques of this disclosure enable the video decoder of a receiving UE to mitigate or potentially eliminate video streaming delay in a VT call, by enabling the decoder to render video data for the VT call upon decoder initialization.

FIG. 1 is a block diagram illustrating a VT call between two UE devices, consistent with techniques of this disclosure. While shown with respect to two UE devices in FIG. 1 for ease of illustration, it will be appreciated that the techniques of this disclosure are equally applicable to VT calls involving greater than two UE devices, as well. Sending UE 12 includes camera unit 14, microphone unit 16, and an audio and video (A/V) processing unit 18. Receiving UE 20 includes display unit 22, speaker unit 24, and an audio and video (A/V) processing unit 26. It will be appreciated that each of sending UE 12 and receiving UE 20 may receive as well as send A/V data in the VT call. As such, each of sending UE 12 and receiving UE 20 may include both input and output devices (cameras and displays, for example). However, purely for ease of illustration, sending UE 12 is shown purely as a data-intake oriented sending-only device, and receiving UE 20 is shown as a receiving-only, data-output oriented device.

Sending UE 12 and/or receiving UE 20 may include, be, or be part of one or more of a smartphone, tablet computer, laptop computer, desktop computer, television (e.g., smart TV), video conferencing device, or any other device capable of receiving and/or transmitting audio and video data. Camera unit 14 of sending UE 12 represents a data-input component that may include one or more cameras that are operable to capture still and/or continuous video images. Camera unit 14 may include cameras that are configured to capture two-dimensional video data and/or three-dimensional video data. Microphone unit 16 represents a data-input component that includes one or more microphones configured to capture audio data or a combination of audio data and directional information (such as an EigenMike® microphone). In various instances, sending UE 12 may archive already-encoded video and/or audio data that may be trans-encoded. In some instances, sending UE 12 may archive raw video and/or audio data that may be encoded.

Display unit 22 of receiving UE 20 represents a data-output component that may include one or more devices operable for presenting video data to a user. Display unit 22 may include any one or more of a variety of image output and/or video output devices such as a cathode ray tube (CRT), a liquid crystal display (LCD), a plasma display, a light emitting diode (LED) display, an organic light emitting diode (OLED) display, or any other type of display device. In these or other examples, display unit 22 may represent an emissive display or a transmissive display. Speaker unit 24 represents a data-output component that may include any one or more of a variety of audio output devices such as headphones, a single-speaker system, a multi-speaker system, or a surround sound system, such as a surround sound speaker layout and/or three-dimensional (3D) headphones.

A/V processing unit 18 and A/V processing unit 26 may include a number of units operable to process video and/or audio data. Each of A/V processing unit 18 and A/V processing unit 26 may be implemented as one or more microprocessors, digital signal processors (DSPs), processing circuitry, such as fixed function processing circuitry and/or programmable processing circuitry, application specific integrated circuits (ASICs), field programmable gate arrays (FPGAs), discrete logic, hardware, or any combinations thereof, and may be configured to execute software and/or firmware. Each of A/V processing unit 18 and A/V processing unit 26 may include one or more video encoders or video decoders, either of which may be integrated as part of a combined encoder/decoder (CODEC). In the particular examples discussed herein with respect to FIG. 1, video encoding functionalities are described with respect to A/V processing unit 18 of sending UE 12 and video decoding functionalities are described with respect to A/V processing unit 26 of receiving UE 20.

To process video data, A/V processing unit 18 and A/V processing unit 26 may implement any number of audio and video compression standards, such as the ITU-T H.264 standard, alternatively referred to as MPEG-4, Part 10, Advanced Video Coding (AVC), or the High Efficiency Video Coding (HEVC) standard, sometimes called the H.265 standard. Generally speaking, A/V processing unit 26 may be configured to perform the reciprocal coding operations of A/V processing unit 18, and vice versa. For instance, the decoding functionalities described herein with respect to A/V unit 26 of receiving UE 20 may be viewed as being substantially reciprocal to the encoding functionalities described herein with respect to A/V unit 18 of sending UE 12.

Packet switched (PS) network 28 generally represents any suitable communication medium, or collection of different communication media, for transmitting audio and/or video data from sending UE 12 to receiving UE 20. PS network 28 may comprise any wireless or wired communication medium, such as a radio frequency (RF) spectrum or one or more physical transmission lines, or any combination of wireless and wired media (e.g., Long-Term Evolution (LTE), High Speed Packet Access (HSPA), Enhanced High Rate Packet Data ((e)HRPD), WiFi, satellite, coax cable, power line, or any combination thereof). PS network 28 may form part of a packet-based network, such as a local area network, a wide-area network, or a global network such as the Internet. Hence, sending UE 12 and receiving UE 20 may communicate over communication channel using a communications protocol such as a standard from the IEEE 802.11 family of standards. In various examples, PS network 28 includes, is, or is part of an IP Multimedia Subsystem (IMS) network. In various examples, "IMS" is also expanded to denote an IP multimedia Core Network Subsystem.

The example of FIG. 1 generally illustrates a two-way VT call over PS network 28. According to some aspects of the two-way VT call, sending UE 12 may be configured to capture video and/or audio data using camera and display unit 14 and microphone and speaker unit 16. A/V processing unit 18 may encode or otherwise compress the audio and/or video data. A/V processing unit 18 also packetizes the data for transmission over PS network 28. In some instances, as described in greater detail below with respect to the example of FIG. 2, A/V processing unit 18 may apply one or more protocols to packetize the data, such as a real-time transport protocol (RTP), a user datagram protocol (UDP), and/or an Internet protocol (IP). In some examples, A/V processing unit 18 may also generate audio and/or video real-time transport control protocol (RTCP) packets along with audio and/or video RTP packets for syncing the audio and video, for media performance related statistics, for rate adaptation, or the like.

At receiving UE 20, A/V processing unit 26 may demodulate, de-packetize (e.g., using protocols matching the protocols implemented at sending UE 12), de-jitter, decode, A/V sync, and/or post-process packets received over the VT call. A/V processing unit 26 may then send the video portions of the processed data to display unit 22 and the audio portions of the processed data to speaker unit 24 for playback to one or more users. While not shown in FIG. 2 for ease of illustration purposes only, it will be appreciated that sending UE 12 may also include or be communicatively coupled to one or more display devices and/or one or more speakers. In some examples, A/V processing unit 26 may also send feedback data to sending UE 12 regarding one or more characteristics of the received data. For example, A/V processing unit 26 may also generate audio and/or video RTCP packets for relaying control data and/or media performance related statistics back to sending UE 12. The bandwidth of PS network 28 may vary during a VT session between sending UE 12 and receiving UE 20. When bandwidth is limited, packets (e.g., RTP packets) carrying audio or video data may be dropped, lost, or corrupted along PS network 28. In such instances, or stemming from various other circumstances, packet loss due to network path deterioration may result in diminished video quality or video freeze (and/or diminished audio quality, audio freeze, or latency) during playback via display unit 22 and/or speaker unit 24.

Moreover, under various circumstances, A/V processing unit 26 may need to initiate or re-initiate video playback using the most recent available i-frame received from sending UE 12. Three non-limiting examples of such scenarios are described below. In one example, A/V processing unit 26 may set up a new VT call. In another example, A/V processing unit 26 may return a VT call to focus via display unit 22, as part of a screen-multitasking process. For instance, A/V processing unit 26 may bring a window associated with the VT call from the background (e.g., hidden behind other windows) into the foreground as shown via display unit 22. In yet another example, A/V processing unit 26 may resume a VT call after placing the VT call on temporary hold. In each of these scenarios, A/V processing unit 26 may perform decoder initialization, to prepare a video decoder of A/V processing unit 26 to render the video stream of the VT call. After the decoder initialization is completed, A/V processing unit 26 may use the next-received i-frame (a "fresh" i-frame) to start or to restart the video stream. Further details of the three example use case scenarios are described in greater detail below.

In the case of a new VT call being established, some amount of signaling between sending UE 12 and receiving UE 20 takes place over PS network 28. For instance, sending UE 12 may signal call initiation information to receiving UE 20, and receiving UE 20 may signal data to complete a "handshake." With the VT call being established, A/V processing unit 18 of sending UE 12 may begin transmitting video frames over PS network 28 to receiving UE 20. For instance, A/V processing unit 18 of sending UE 12 may transmit i-frames interleaved with p-frames and/or b-frames. In turn, A/V processing unit 26 of receiving UE 20 may begin receiving video frames of the VT call prior to completing decoder initialization.

In the case of multi-tasking scenarios, A/V processing unit 26 may resume rendering the video feed of the video call if the display window of the VT application is re-maximized after being minimized, or if the display window of the VT application is brought back into focus after being placed in the background in favor of another window. For instance, during the VT call, a user of receiving UE 20 may open a new browser window, or re-focus a browser window that is currently in the background, to collect information. However, while viewing the browser window, the user may keep the VT application running in the background on receiving UE 20, thereby maintaining the output of the VT call's audio feed via speaker unit 24. In one use-case scenario, receiving UE 20 may represent a laptop computer, and may provide multitasking capabilities by way of running a Windows® operating system.

In scenarios where the VT call is put on a temporary hold and then resumed, receiving UE 20 may keep the VT call active, while causing A/V processing unit 26 to temporarily suspend rendering of video data over display unit 22 and audio data over speaker unit 24. For instance, in one use case scenario, receiving UE 20 may represent a cellular telephone, such as a so-called smartphone. While a user of receiving UE 20 is operating a VT call using a VT application running on receiving UE 20, receiving UE 20 may receive an incoming voice call over a cellular (e.g., 3G® or 4G®) network. In turn, receiving UE 20 may invoke a voice call application that outputs alerts (e.g., via display unit 22 and/or speaker unit 24) regarding the incoming cellular voice call.

In this example, the user may provide inputs to accept the incoming cellular call via the voice call application and to put the VT call on temporary hold. When the cellular call is terminated or put on hold via the voice call application, the user may resume the VT call using the VT application. In some examples, the user may later merge the voice call into the VT call using receiving UE 20. In any event, when the user takes the VT call off of temporary hold, A/V processing unit 26 may resume rendering video and audio data for output via display unit 22 and speaker unit 24, respectively.

In all three of the examples listed above, A/V processing unit 26 may perform decoder initialization to commence or resume (as the case may be) rendering the VT call's video stream for output via display unit 22. However, according to existing VT call processing technology, A/V processing unit 26 may discard all frames that are received for the VT call before the decoder initialization is completed. Thus, according to existing VT technology, A/V processing unit 26 may need to await the post-initialization receipt of a newly-received (e.g., a fresh) i-frame in order to start or restart rendering of the video stream.

Depending on the technology supported by sending UE 12, A/V processing unit 26 may receive the fresh post-initialization i-frame in response to different types of stimuli. In one example, the stimulus is time. In instances where sending UE 12 supports audio video profile (AVP) technology, A/V processing unit 18 of sending UE 12 may only generate a new i-frame upon detecting that a predetermined time has passed since the last i-frame was generated. For instance, A/V processing unit 18 of sending UE 12 may set the predetermined time as the inverse (reciprocal value) of the refresh rate. Because the refresh rate represents a number of frames per unit time (such as frames per second), the inverse may represent an amount of time between consecutive frames (e.g., seconds per frame generation). Thus, in scenarios where sending UE 12 supports AVP without any enhancements, A/V processing unit 26 of receiving UE 20 may need to wait, after decoder initialization, for A/V processing unit 18 of sending UE 12 to generate a new i-frame in response to a time-based stimulus. In turn, A/V processing unit 26 of receiving UE 20 may cause a video delay on each occasion that A/V processing unit 26 starts a new VT call or resumes the video stream of an existing VT call. In cases where sending UE 12 supports AVP without any enhancements, A/V processing unit 26 may, after completing decoder initialization, experience delays as long as ten seconds before receiving a fresh i-frame with which to start or restart rendering the video feed. Such a delay diminishes the user experience for one or more users of receiving UE 20. For instance, the user(s) of receiving UE 20 is presented with a blank screen or a placeholder image for the first several (e.g., sometimes as high as ten) seconds of the VT call.

In some instances, sending UE 12 supports an enhanced version of AVP, known as audio video profile with feedback (AVPF). If sending UE 12 supports AVPF, then A/V processing unit 18 of sending UE 12 may be configured to generate a fresh i-frame proactively time (by default), or reactively to a received PLI/FIR (the receipt of which preempts the time stimulus). For instance, if sending UE 12 supports AVPF, then A/V processing unit 18 may generate a fresh i-frame if A/V processing unit 18 receives a PLI/FIR, regardless of how much time has passed since A/V processing unit 18 last generated an i-frame. Upon generating a new i-frame, A/V processing unit 18 may restart a timer to detect the passage of time until A/V processing unit 18 would need to proactively generate another i-frame. Thus, in an AVPF-supported scenario, A/V processing unit 18 may generate i-frames based on the default refresh rate, with additional i-frame generation on an as-needed basis instigated by an incoming PLI/FIR.

In scenarios where sending UE 12 supports AVPF, A/V processing unit 26 of receiving UE 20 may, upon completing decoder initialization, generate a PLI/FIR and transmit the generated request to sending UE 12 over PS network 28. In this way, A/V processing unit 26 may elicit a fresh i-frame that A/V processing unit 26 can use once the video decoder is ready to begin or resume rendering. However, the process of initializing the decoder, then generating and sending a PLI/FIR, and then awaiting a new i-frame, causes a post-initialization delay at A/V processing unit 26. The post-initialization delay at A/V processing unit 26 in the PLI/FIR-based implementation may be as high as three seconds in some cases.

Moreover, this process also consumes computing resources at receiving UE 20 and bandwidth over PS network 28. As an example of bandwidth wastage over PS network 28, the PLI/FIR-based implementation entails transmission of two data-rich i-frames over PS network 28 within a short period of time. More specifically, the first of these consecutive i-frames is transmitted before decoder initialization is complete, and the second i-frame is transmitted shortly after decoder initialization, in response to the PLI/FIR. Additionally, this technique causes resource wastage at sending UE 12, because A/V processing unit 18 is called upon to generate two i-frames within quick succession.

According to various aspects of this disclosure, receiving UE 20 may be configured to store, or "cache" at least one i-frame that was received before A/V processing unit 26 completed decoder initialization. More specifically, receiving UE 20 may cache an i-frame of a particular VT call, such that the cached i-frame is the most recently-received i-frame before completion of decoder initialization. A/V processing unit 26 may use the cached pre-initialization i-frame to begin rendering the video stream of the VT call once A/V processing unit 26 completes the video decoder initialization process. For instance, upon decoder initialization, A/V processing unit 26 may render and output the cached i-frame via display unit 22. In turn, A/V processing unit 26 may apply any p-frames and/or b-frames (collectively, "prediction frames") to the cached i-frame to continue rendering moving pictures of the video stream. In this manner, the techniques of this disclosure provide configurations that enable A/V processing unit 26 of receiving UE 20 to render the video stream of a VT call without a post-initialization lag time.

As introduced above, A/V processing unit 26 may implement the techniques of this disclosure to begin rendering video data immediately upon or shortly after A/V processing unit 26 completes the process of video decoder initialization. Thus, A/V processing unit 26 may begin outputting a VT call's video stream via display unit 22 with a mitigated delay, i.e., reduced delay, (or potentially no delay) in comparison to outputting the VT call's audio stream via speaker unit 24. Moreover, by implementing the techniques of this disclosure, receiving UE 20 may enable A/V processing unit 26 to apply prediction frames that are received after decoder initialization is complete.

By comparison, according to existing VT call management technology, A/V processing unit 26 would discard any prediction frames that are received after decoder initialization, because A/V processing unit 26 would not have an i-frame from which to generate new frames using the delta information of the prediction frames. Instead, according to the existing VT call management technology, A/V processing unit 26 would need to wait to receive a post-initialization i-frame before rendering the video stream.

However, the UE configurations of this disclosure enable A/V processing unit 26 to make use of prediction frames that are received after decoder initialization is completed. Because A/V processing unit 26 has access to a cached i-frame that was received prior to the completion of decoder initialization, A/V processing unit 26 has access to a base picture to which to apply the delta information of the prediction frames. Thus, A/V processing unit 26 may render predicted pictures of the video stream using the prediction frames that are received after decoder initialization, but before receiving a post-initialization i-frame.

By implementing the i-frame caching techniques of this disclosure, A/V processing unit 26 may provide one or more enhancements with respect to existing VT call management technology. For example, A/V processing unit 26 may begin rendering the video stream of a VT call without the lag time caused by existing VT call management technology. Also, by implementing the techniques described herein, A/V processing unit 26 may conserve bandwidth over PS network 28 and/or computing resource expenditure by sending UE 12. For instance, by caching a pre-initialization i-frame and using the cached i-frame for rendering the video stream upon decoder initialization, A/V processing unit 26 may alleviate the bandwidth and computing resource wastage that would be caused by discarding prediction frames that are received after decoder initialization.

Moreover, by using the cached i-frame for rendering, A/V processing unit 26 may, in many instances, eliminate the need to send a PLI/FIR to sending UE 12 upon decoder initialization (in cases where sending UE 12 supports AVPF). According to the existing VT call management technology, A/V processing unit 26 receives a pre-initialization i-frame, then discards the i-frame, and then sends a PLI/FIR to invoke a new i-frame. This procedure results in resource and bandwidth wastage, particularly in cases where the pre-initialization and post-initialization i-frames are generated in faster succession than normal (e.g., based on the refresh rate provided by sending UE 12). The generation and transmission of the PLI/FIR cause bandwidth wastage over PS network 28 and resource wastage at receiving UE 20. The processing of the PLI/FIR, the generation of a new i-frame, and the transmission of the new i-frame represent bandwidth wastage over PS network 28 and resource wastage at sending UE 12.

The techniques of this disclosure, in contrast, enable A/V processing unit 26 to use a pre-initialization i-frame to begin the video rendering process, thereby obviating the need for A/V processing unit 26 to generate and send a PLI/FIR upon decoder initialization. Thus, the techniques of this disclosure enable receiving UE 20 to conserve the resources that would otherwise be expended to generate the PLI/FIR, as well as to process a post-initialization i-frame in rapid succession after the pre-initialization i-frame. In turn, the techniques of this disclosure may enable sending UE 12 to conserve the resources that would otherwise be expended to process the incoming PLI/FIR, as well as to generate and transmit another i-frame in quicker succession than the current refresh rate would otherwise require. The techniques of this disclosure also may conserve the bandwidth that would otherwise be expended over PS network 28 to transport the PLI/FIR and the i-frame that is elicited by the PLI/FIR.

In scenarios where sending UE 12 supports only AVP, the techniques of this disclosure still enable receiving UE 20 to begin rendering the video stream upon decoder initialization. Thus, in scenarios where sending UE 12 only supports AVP, the techniques of this disclosure enable receiving UE 12 to make use of prediction frames that are received after decoder initialization and before receiving a post-initialization i-frame. It will be appreciated that, according to existing VT call management technology, such prediction frames are still generated at sending UE 12, transmitted over PS network 28, and received at receiving UE 20. However, such prediction frames are not used for video rendering under the existing VT call management technology. Thus, according to the existing VT call management technology, the above-described process entails resource wastage at both sending UE 12 and receiving UE 20, and bandwidth wastage over PS network 28. In contrast, according to the techniques of this disclosure, the resource consumption at sending UE 12 and receiving UE 20, as well as the bandwidth consumption over PS network 28, are not wasted, because A/V processing unit 26 renders video data using prediction frames received after decoder initialization but before receiving a post-initialization i-frame.

Figure 2:
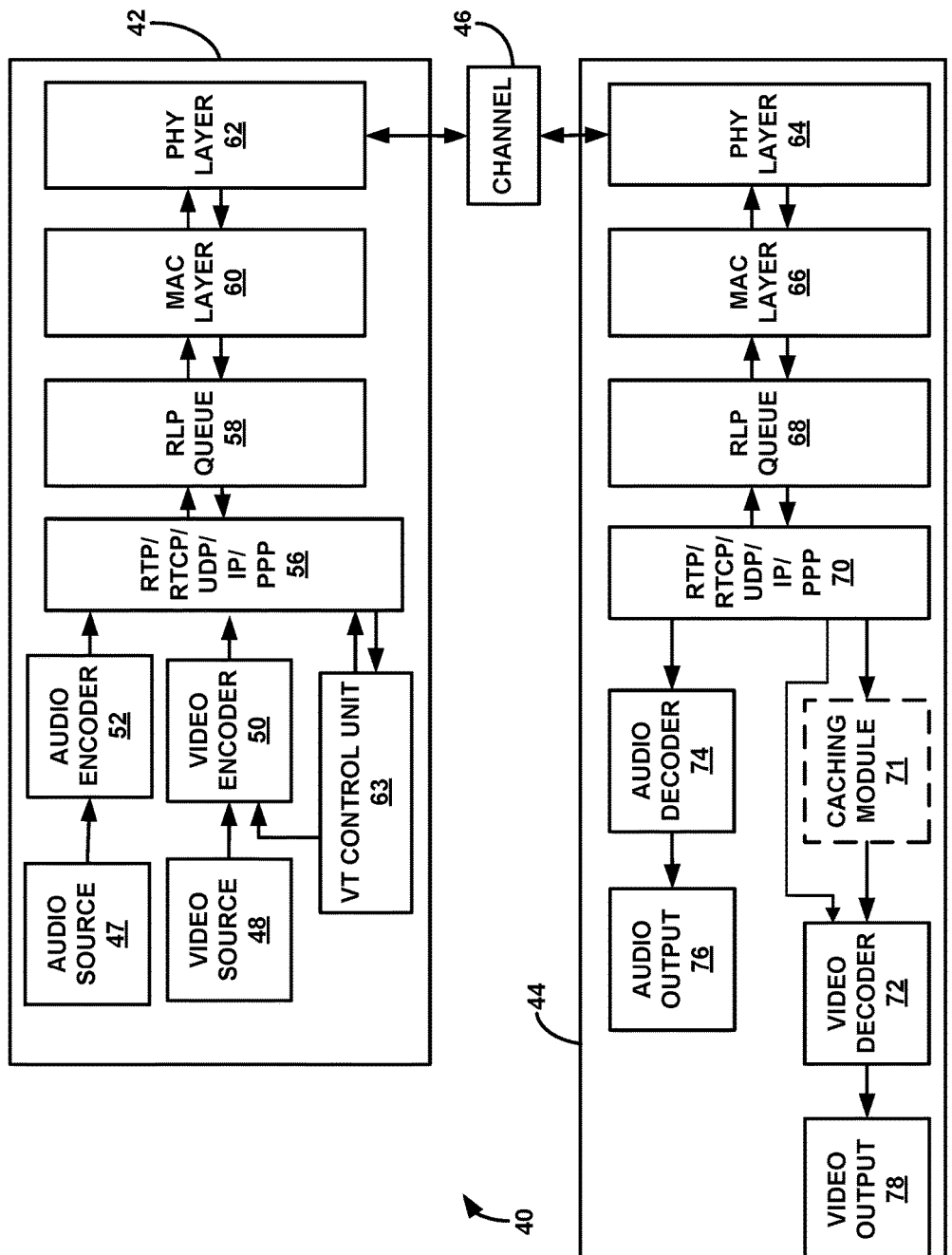
FIG. 2 is a block diagram illustrating further details of a VT system in accordance with the aspects of this disclosure.

FIG. 2 is a block diagram illustrating further details of a VT system 40 in accordance with the aspects of this disclosure. FIG. 2 illustrates details of VT communication, and the details illustrated in FIG. 2 are described below. VT system 40 includes a remote UE 42 and a receiving UE 44 that are connected by a transmission channel 46. In the example of FIG. 2, remote UE 42 includes an audio source 47, video source 48, video encoder 50, audio encoder 52, real-time transport protocol (RTP)/real-time transport protocol (RTCP)/user datagram protocol (UDP)/Internet protocol (IP)/point-to-point protocol (PPP) conversion unit 56, radio link protocol (RLP) queue 58, MAC layer unit 60, physical (PHY) layer unit 62, and VT control unit 63. Receiving UE 44 includes a PHY layer unit 64, MAC layer unit 66, RLP queue 68, RTP/RTCP/UDP/IP/PPP conversion unit 70, caching unit 71, video decoder 72, audio decoder 74, audio output device 76 and video output device 78. It will be appreciated that each of receiving UE 44 and remote UE 42 may include both send-related and receive-related components, although FIG. 2 illustrates each of receiving UE 44 and remote UE 42 with a subset of these components, for ease of illustration purposes.

Functionalities described with respect to various devices and components illustrated in FIG. 2 may be executed by one or more processors, such as one or more digital signal processors (DSPs), general purpose microprocessors, application specific integrated circuits (ASICs), processing circuitry (e.g., programmable processing circuitry, or fixed function processing circuitry, or a combination of programmable and fixed function processing circuitry), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein, such as, but not limited to, the functionalities described with respect to RTP/RTCP/UDP/IP/PPP conversion unit 70, caching unit 71, and video decoder 72 may be provided within dedicated hardware and/or software units or modules configured for encoding and decoding, or incorporated in a combined codec. Also, the described functionalities may be fully implemented in one or more circuits or logic elements. For instance, the functionalities described with respect to the devices and components illustrated in FIG. 2, including but not limited to the functionalities described with respect to RTP/RTCP/UDP/IP/PPP conversion unit 70, caching unit 71, and video decoder 72 may be implemented by processing circuitry. Examples of processing circuitry that may implement functionalities described with respect to devices and components illustrated in FIG. 2 (e.g., functionalities described with respect to RTP/RTCP/UDP/IP/PPP conversion unit 70, caching unit 71, video decoder 72, etc.) include programmable processing circuitry, fixed function processing circuitry, or a combination of programmable processing circuitry and fixed function processing circuitry. The techniques of this disclosure may be implemented in a wide variety of devices or apparatuses, including a wireless handset, an integrated circuit (IC) or a set of ICs (e.g., a chip set).

System 40 may provide bi-directional video and audio transmission, such as for VT calls, via transmission channel 46. Accordingly, generally reciprocal encoding, decoding, and conversion units may be provided on opposite ends of channel 46. In some examples, remote UE 42 and receiving UE 44 may be embodied within video communication devices such as wireless mobile terminals equipped for video streaming, video telephony, or both. The mobile terminals may support VT according to packet-switched standards such as RTP, RTCP, UDP, IP, or PPP over an IMS.

For example, at remote UE 42, RTP/RTCP/UDP/IP/PPP conversion unit 56 adds appropriate RTP/RTCP/UDP/IP/PPP header data to audio and video data received from video encoder 50 and audio encoder 52 and places the data in RLP queue 58. An example bitstream may include a MAC header, an IP header, a UDP header, an RTCP header, and the payload data. In some examples, RTP/RTCP runs on top of UDP, while UDP runs on top of IP, and IP runs on top of PPP. In some examples, as described herein, RTP/RTCP/UDP/IP/PPP conversion unit 56 may conform to a particular standard, such as "RFC 3550: RTP: A Transport Protocol for Real-Time Applications," H. Schulzrinne et al., July 2003, "RFC 5104: Codec Control Messages in the RTP Audio-Visual Provide with Feedback (AVPF)," S. Wenger et al., February 2008 (hereinafter RFC 5104), and/or other applicable standards for real-time or near real-time transport of data. MAC layer unit 60 generates MAC RLP packets from the contents of RLP queue 58. PHY layer unit 62 converts the MAC RLP packets into PHY layer packets for transmission over channel 46.

PHY layer unit 64 and MAC layer unit 66 of receiving UE 44 operate in a reciprocal manner. PHY layer unit 64 converts PHY layer packets received from channel 46 to MAC RLP packets. MAC layer unit 66 places the MAC RLP packets into RLP queue 68. RTP/RTCP/UDP/IP/PPP conversion unit 70 strips the header information from the data in RLP queue 68, and reassembles the video and audio data for delivery to video decoder 72 and audio decoder 74, respectively.

In general, channel 46 carries the PHY layer packets from remote UE 42 to receiving UE 44. Channel 46 may be any physical connection between remote UE 42 and receiving UE 44. For example, channel 46 may be a wired connection, such as a local or wide-area wired network. Alternatively, as described herein, channel 46 may be a wireless connection such as a cellular, satellite or optical connection. Channel conditions may be a concern for wired and wireless channels, but may be particularly pertinent for mobile VT applications performed over a wireless channel 46, in which channel conditions may suffer due to fading or congestion. Channel 46 may support a particular network link rate (e.g., a particular bandwidth), which may fluctuate according to channel conditions. For example, channel 46 may be characterized by a reverse link (RL) having a throughput that varies according to channel conditions.

At remote UE 42, video source 48 provides video data to video encoder 50. Video encoder 50 generates encoded video data according to a video compression method, such as MPEG-4, ITU H.264, alternatively referred to as MPEG-4, Part 10, Advanced Video Coding (AVC), ITU H.265, High Efficiency Video Coding (HEVC), or another video coding standard. Other video compression methods include the International Telecommunication Union (ITU) H.263 or MPEG-2 methods. Audio encoder 52 encodes audio data to accompany the video data. Video source 48 may be a video capture device, such as one or more video cameras, one or more video archives, or a combination of video cameras and video archives.

Audio source 47 provides audio data to audio encoder 52. Audio encoder 52 may encode the audio data according to an audio compression method, such as adaptive multi-rate narrow band (AMR-NB), or other techniques. The audio source 47 may be an audio capture device, such as a microphone, or a speech synthesizer device. For VT applications, the video will permit viewing of a party to a VT conference and the audio will permit the speaking voice of that party to be heard.

RTP/RTCP/UDP/IP/PPP conversion unit 56 obtains video and audio data packets from video encoder 50 and audio encoder 52. As mentioned previously, RTP/RTCP/UDP/IP/PPP conversion unit 56 adds appropriate header information to the audio packets and inserts the resulting data within RLP queue 58. Likewise, RTP/RTCP/UDP/IP/PPP conversion unit 56 adds appropriate header information to the video packets and inserts the resulting data within RLP queue 58. MAC layer unit 60 retrieves data from RLP queue 58 and forms MAC layer packets. Each MAC layer packet carries RTP/RTCP/UDP/IP/PPP header information and audio or video packet data that is contained within RLP queue 58. Audio packets may be inserted into RLP queue 58 independently of video packets.

In some cases, a MAC layer packet generated from the contents of RLP queue 58 will carry only header information and video packet data. In other cases, the MAC layer packet will carry only header information and audio packet data. In many cases, the MAC layer packet will carry header information, audio packet data and video packet data, depending on the contents of RLP queue 58. The MAC layer packets may be configured according to a radio link protocol (RLP), and may be referred to as MAC RLP packets. PHY layer unit 62 converts the MAC RLP audio-video packets into PHY layer packets for transmission across channel 46.

At receiving UE 44, PHY layer unit 64 identifies the MAC layer packets from the PHY layer packets and reassembles the content into MAC RLP packets. MAC layer unit 66 then reassembles the contents of the MAC RLP packets to provide video and audio packets for insertion within RLP queue 68. RTP/RTCP/UDP/IP/PPP unit 70 removes or "strips" the accompanying header information and provides video packets to video decoder 72 and audio packets to audio decoder 74. Video decoder 72 decodes the video data frames to produce a stream of video data for playback, e.g., for use in driving video output device 78 (e.g., a display device). Audio decoder 74 decodes the audio data to produce audio information for presentation to a user, e.g., via an audio speaker at audio output device 76.

In some examples, receiving UE 44 may generate control data for transmission to remote UE 42 via channel 46. For example, RTP/RTCP/UDP/IP/PPP unit 70 of receiving UE 44 may generate one or more RTCP packets. In general, RTCP is based on the periodic transmission of control packets to all participants of a particular session that uses the same distribution mechanism as the data packets (e.g., the RTP packets). Hence, the underlying RTCP protocol provides multiplexing of the data and control packets, for example using separate port numbers with UDP.

Video decoder 72 may need to be "initialized" in order to render video data of the VT call for display via video output 78. Upon detecting signaling of packets, such as packets carrying H.264 video data for a VT call, receiving UE 44 may begin initialization for video decoder 72. According to existing VT call management technology, video decoder 72 would discard all video data (including i-frame data) that was received before the decoder initialization process is completed. However, according to various aspects of this disclosure, video decoder 72 and other components of receiving UE 44 may cache i-frame data extracted from the received packets (e.g., packets of H.264 video data), and use the cached i-frame data during post-initialization rendering of video data.

For instance, RTP/RTCP/UDP/IP/PPP unit 70 may remove the RTP header of a received video (e.g., H.264) packet (or "decapsulate" the packet), and forward the payload. If video decoder 72 is in an initialized state (e.g., a state in which video decoder 72 is enabled to decode and render video frame data), then RTP/RTCP/UDP/IP/PPP unit 70 may bypass caching unit 71, and provide the decapsulated payload directly to video decoder 72. For instance, if video decoder 72 is in the initialized state, then video decoder 72 may decode video frame data to obtain decoded video frame data that can be rendered for display. However, if RTP/RTCP/UDP/IP/PPP unit 70 determines that video decoder 72 is not yet initialized, then RTP/RTCP/UDP/IP/PPP unit 70 may provide the decapsulated payload to caching unit 71.

Caching unit 71 is illustrated using dashed-line borders in FIG. 2, to indicate that the functionalities described herein with respect to caching unit 71 may be implemented by other component(s) of receiving UE 44 in various examples. Upon receiving an extracted payload from RTP/RTCP/UDP/IP/PPP unit 70, may use the leading information of the payload of a received packet to determine the frame type associated with the video data included in the packet. For instance, caching unit 71 may inspect the first byte of the payload to determine whether or not the received packet includes an i-frame. In this example, if caching unit 71 determines that the first byte of the payload indicates a value of 124, then caching unit 71 may determine that the received packet contains i-frame data. For instance, caching unit 71 may determine that the first byte of the payload includes a hexadecimal (or "hex") value of 0x7C. Caching unit 71 may apply a hex-to-decimal conversion to determine that the first byte of the payload indicates a decimal value of 124. Based on the first byte of the payload indicating the decimal value of 124, caching unit 71 may determine that the received packet includes i-frame data.

If caching unit 71 determines that the payload of a decapsulated payload includes i-frame data, then caching unit 71 may implement the techniques of this disclosure to store the i-frame data locally, such as to a storage device or buffer of receiving UE 44. Because RTP/RTCP/UDP/IP/PPP unit 70 routed the i-frame to caching unit 71 instead of directly to video decoder 72, the i-frame was received before video decoder 72 was fully initialized for rendering. By caching such a pre-decoder-initialization i-frame locally, caching unit 71 enables other components of receiving UE 44 to access and use the pre-decoder-initialization i-frame at a later time. Then, once the video decoder is initialized, caching unit 71 provides the cached i-frame to the video decoder. For instance, upon detecting a transition of video decoder 72 from a pre-initialized state to an initialized state, caching unit 71 may provide the cached i-frame to video decoder 72. In this manner, caching unit 71 may permit the video decoder 72 to immediately decode the cached i-frame to obtain decoded video frame data, rather than wait for a newly transmitted i frame from UE 42, thereby reducing delay in providing video output via video output device 78.

Various aspects of this disclosure are described herein with respect to H.264-compliant video data as non-limiting examples. It will be appreciated that aspects of this disclosure are equally applicable to video data that is compliant with other video coding standards, such as HEVC. In some examples, RTP/RTCP/UDP/IP/PPP unit 70 is agnostic to the outcome of the packet inspection performed by caching unit 71. Thus, RTP/RTCP/UDP/IP/PPP unit 70 may continue to send the payloads extracted from all packets that encapsulated video frame data (e.g., H.264 or H.265 video data) to caching unit 71, so long as RTP/RTCP/UDP/IP/PPP unit 70 detects that video decoder 72 is not fully initialized for rendering. In turn, caching unit 71 may continue to inspect and analyze the first byte of each received payload, even if caching unit 71 has already stored an i-frame to local storage. If caching unit 71 identifies an i-frame, then caching unit 71 may replace the previously-stored i-frame with the more recently identified i-frame. For instance, caching unit 71 may overwrite the buffered data that represents the previously-cached i-frame with data representing the more recently identified i-frame. Thus, at a given time, caching unit 71 may maintain the most recent pre-decoder-initialization i-frame in local storage. In this way, caching unit 71 may implement the techniques of this disclosure to provide video decoder 72 with the most up-to-date available i-frame data.

Upon completion of initialization, video decoder 72 is in condition to begin rendering video data from payload information that video decoder 72 may receive. In accordance with the techniques of this disclosure, video decoder 72 may, upon completion of the initialization process, check whether any i-frame data is already stored locally at receiving UE 44. As discussed above, caching unit 71 may store the most recent pre-decoder-initialization i-frame locally in cache memory at receiving UE 44. Video decoder 72 may check whether such an i-frame is stored and "waiting" at the time when video decoder 72 is fully initialized.

If video decoder 72 detects a cached i-frame upon initialization, then video decoder 72 may utilize the cached i-frame to begin rendering of the VT call immediately upon decoder initialization. For example, video decoder 72 may begin by rendering the i-frame that video decoder 72 retrieved upon initialization. In turn, in this example, video decoder 72 may continue rendering the video stream by applying any subsequently-received prediction frames to the retrieved i-frame. Upon receiving a fresh post-initialization i-frame from RTP/RTCP/UDP/IP/PPP unit 70, video decoder 72 may restart the process of rendering the fresh i-frame and any subsequently-received prediction frames.

To render the video stream, video decoder 72 may provide the decoded video frame data of the stream to video output 78 for display. In this way, RTP/RTCP/UDP/IP/PPP unit 70, caching unit 71, and video decoder 72 may be configured according to the aspects of this disclosure to begin video rendering immediately or shortly after decoder initialization, without the lag time associated with traditional VT call management technology. While use case scenarios are discussed above with respect to packets encapsulating video frame data that conforms to the H.264 standard, it will be appreciated that receiving UE 44 may implement the techniques of this disclosure manage VT calls using packets encapsulating video frame data conforming to other protocols as well, including, but not limited to, the H.265 standard (HEVC).

Figure 3:
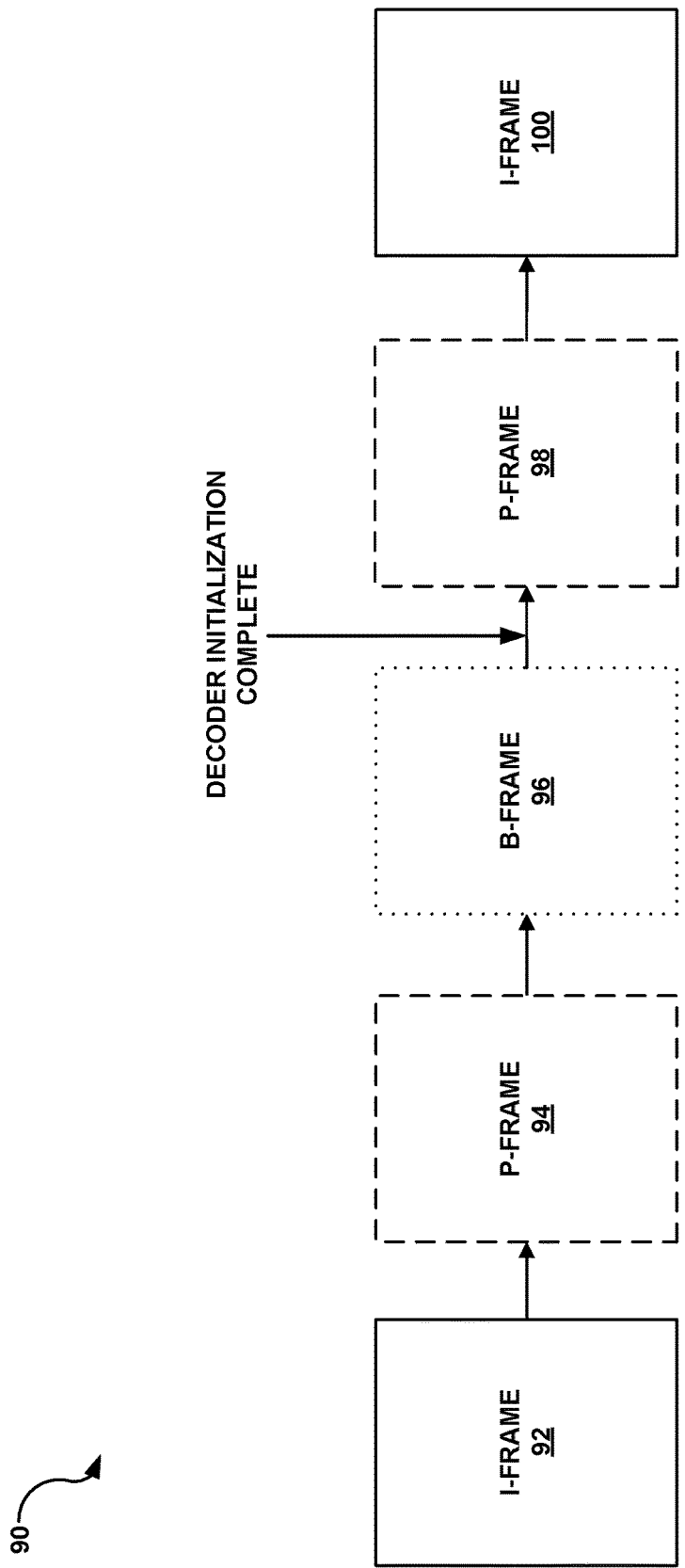
FIG. 3 is a conceptual diagram illustrating a frame sequence that a sending device may transmit to a receiving device as part of the video stream of a VT call.

FIG. 3 is a conceptual diagram illustrating a frame sequence 90 that sending UE 12 may transmit to receiving UE 20 as part of the video stream of a VT call. Frame sequence 90 illustrates frames in output order, starting at the left with the earliest-transmitted frame, and moving progressively to the right in terms of subsequently-transmitted frames. Because frame sequence 90 illustrates frames in terms of sequential output order, it will be appreciated that the right-facing arrows of FIG. 3 represent a chronological progression, and do not necessarily represent (or fully represent) the prediction direction associated with the respective frames. As will be discussed in further detail below, frame sequence 90 also crosses the time boundary of decoder initialization. While many devices and systems may be configured according to aspects of this disclosure to process frame sequence 90, for ease of discussion purposes only, the processing of frame sequence 90 is described with respect to receiving UE 20 described above with respect to and illustrated in FIG. 1.

Different frame types are distinguished using different borders in FIG. 3. I-frames are shown with solid-line borders, p-frames are shown with dashed-line borders, and b-frames are shown with dotted-line borders. The processing of frame sequence may begin when receiving UE 20 receives i-frame 92. Receiving UE 20 may determine that i-frame 92 is received prior to the completion of the video decoder initialization process at receiving UE 20. For this reason, i-frame 92 is referred to hereinafter as "pre-initialization i-frame 92." Based on the determination that pre-initialization i-frame 92 was received before receiving UE 20 has completed decoder initialization, receiving UE 20 may store pre-initialization i-frame 92 locally, e.g., to a storage buffer, e.g., a cache memory, included in receiving UE 20. As shown in FIG. 3, receiving UE 20 may also receive multiple prediction frames, namely, pre-initialization p-frame 94 and pre-initialization b-frame 96, before completing decoder initialization. However, upon determining (e.g., using the payload-checking techniques described above) that pre-initialization p-frame 94 and pre-initialization b-frame 96 are not i-frames, receiving UE 20 may discard pre-initialization p-frame 94 and pre-initialization b-frame 96.

It will be appreciated that FIG. 3 illustrates a simplified scenario, for ease of illustration purposes only. In many use case scenarios, receiving UE 20 may receive significantly greater numbers of prediction frames, with varying distributions of p-frames and/or b-frames. Moreover, in many use case scenarios, receiving UE 20 may receive multiple i-frames prior to completing decoder initialization. If receiving UE 20 receives multiple i-frames prior to completing decoder initialization, then receiving UE 20 may maintain only the most recently received pre-initialization i-frame in the cache, by replacing a previously stored "stale" pre-initialization i-frame with a fresh pre-initialization i-frame.

After decoder initialization is completed, receiving UE 20 may render and output the most recently stored pre-initialization i-frame 92 for display. In turn, receiving UE 20 may apply post-initialization p-frame 98 to the data of pre-initialization i-frame 92 to render a subsequent image of the video stream of the VT call. Upon receiving post-initialization i-frame 100, receiving UE may restart the process of rendering the video stream of the VT call in real time.

Figure 4:
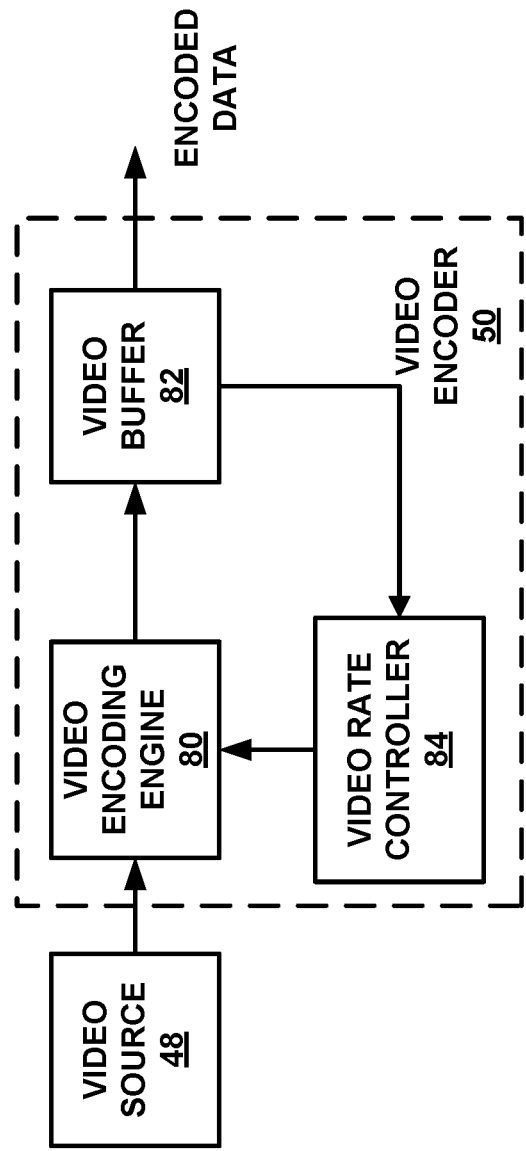
FIG. 4 is a block diagram illustrating a portion of a device in the system illustrated in FIG. 2 in greater detail.

FIG. 4 is a block diagram illustrating a portion of remote UE 42 (FIG. 2) in greater detail. For example, FIG. 4 illustrates video encoder 50 having video encoding engine 80, video buffer 82 and video rate controller 84. In general, video encoding engine 80 obtains video data from video source 48 and encodes the video data at a rate controlled by video rate controller 84. Video encoding engine 80 then places the encoded video in video buffer 82. Video rate controller 84 may monitor the fullness of video buffer 82 and control the video encoding rate applied by video encoding engine 80, at least in part, based on the fullness. Video rate controller 84 may set various parameters with respect to the filling of video buffer 82, including parameters such as the frame rate and/or the refresh rate. As discussed above, the frame rate refers to a frames-per-unit time characteristic in the type of frame is irrelevant. For example, the frame rate may account for i-frames, p-frames, and b-frames. The refresh rate refers to an i-frames-per-unit time metric, in that the refresh rate tracks a number of frames of a specific type (namely, i-frames) loaded to video buffer 82 per unit time.

In some examples, video encoder 50 may provide a video source rate control scheme that is generally CODEC-independent. For example, video encoder 50 may be adapted for video encoding according to ITU H.265 (HEVC), MPEG4, ITU H.263, ITU H.264. In addition, video encoder 50 may be susceptible to implementation within a DSP or embedded logic core. In some examples, video encoder 50 (e.g., video rate controller 84 or video encoder 50) may apply model-based rate control, e.g., applying video block rate control in the rho domain. For example, once a frame bit budget is established for a particular video frame, the frame bit budget may be allocated among the video blocks, e.g., coding units (CUs) and/or macroblocks (MBs), within the frame.

Figure 5:
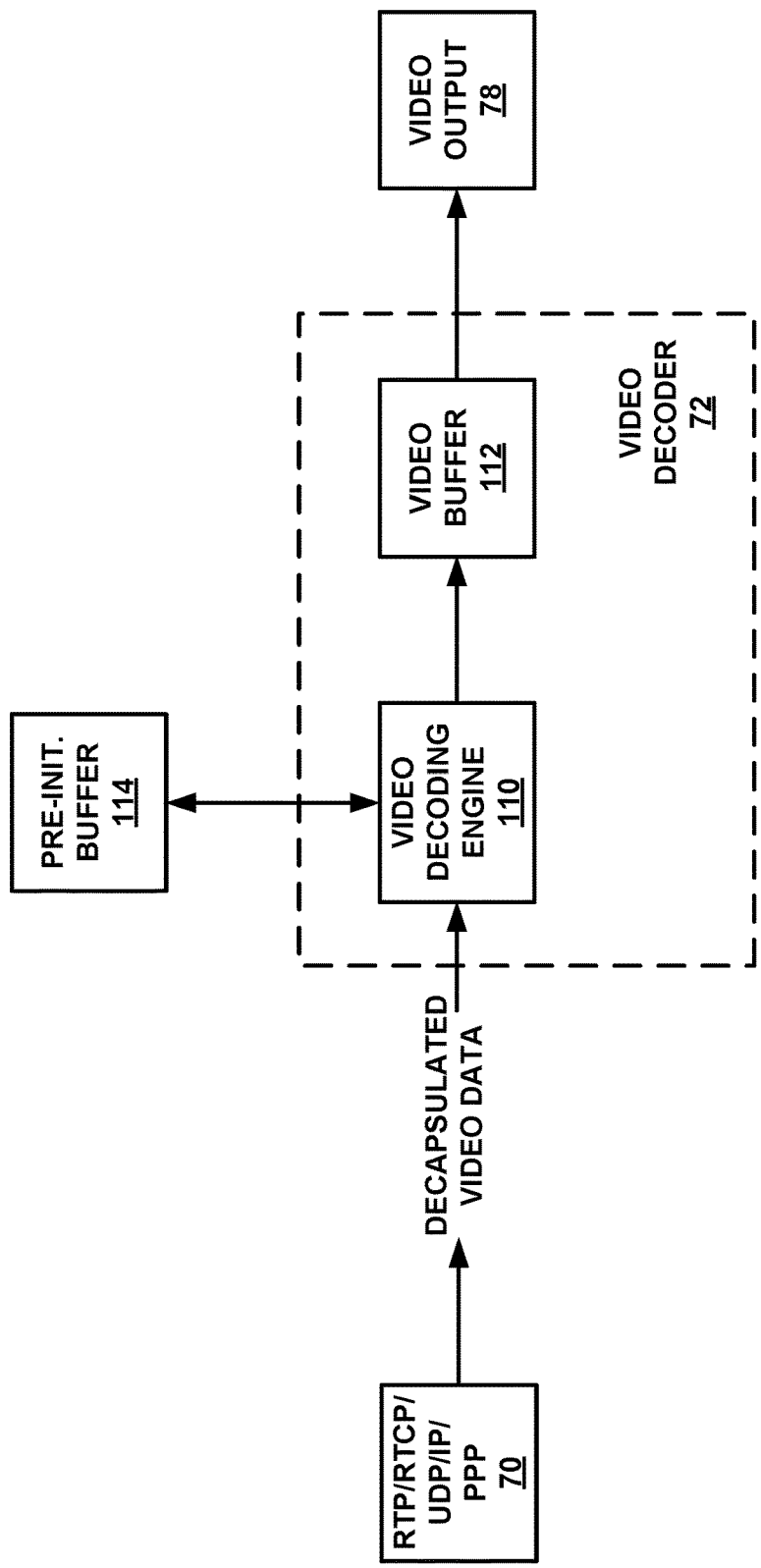
FIG. 5 is a block diagram illustrating a portion of a device illustrated in FIG. 3 in greater detail.

FIG. 5 is a block diagram illustrating a portion of receiving UE 44 (FIG. 2) in greater detail. For example, FIG. 5 illustrates video decoder 72 having video decoding engine 110 and video buffer 112. In general, video decoding engine 110 obtains video data that RTP/RTCP/UDP/IP/PPP unit 70 has decapsulated from packets received as part of a VT call. As shown in FIG. 5, and as described above with respect to FIG. 2, RTP/RTCP/UDP/IP/PPP unit 70 may send decapsulated video data to video decoder 72. In turn, video decoding engine 110 may be configured, according to aspects of this disclosure, to inspect the first byte of a received decapsulated video payload, to determine whether or not the received payload represents i-frame information.

If video decoding engine 110 determines that video decoder 72 is not yet initialized, and that the received payload represents i-frame information, then video decoding engine 110 may store the i-frame information to pre-initialization buffer 114. In some examples, video decoding engine 110 may set a "holding period," which represents a maximum length of time for which i-frame data is permitted to remain stored in pre-initialization buffer 114. The holding period may be expressed in various units of time, such as in seconds. Moreover, the holding period represents a variable quantity, and is denoted herein by the letter 'y.' Thus, video decoding engine 110 may cache i-frame data to pre-initialization buffer 114, and allow the cached i-frame data to remain stored in pre-initialization buffer 114 for a maximum of 'y' seconds. Upon the expiration of 'y' seconds from the time the i-frame data was stored to pre-initialization buffer 114, video decoding engine 110 may determine that the i-frame data has become stale. In turn, based on the stored i-frame data having become stale, video decoding engine 110 may discard the stale i-frame data from pre-initialization buffer 114.

For instance, video decoding engine 110 may implement a timer, such as a countdown or count-up timer. Video decoding engine 110 may activate the timer upon caching i-frame data to pre-initialization buffer 114. If the timer expires, and the initialization process for video decoder 72 is not yet completed, then video decoding engine 110 may determine that the cached i-frame data has become "stale." For example, an i-frame may be considered stale at a point of time when any subsequently received prediction frames do not provide delta information that references the i-frame. Video decoding engine may set the value of 'y' based on the refresh rate of the UE that sent the i-frame. For instance, the inverse of the refresh rate (a value represented in seconds) has passed since the caching of the last i-frame to pre-initialization buffer 114, then video decoding engine 110 may determine that the cached i-frame is no longer usable in rendering the video stream. If video decoding engine 110 determines that the cached i-frame has become stale, then video decoding engine 110 may discard the cached i-frame, such as by erasing the stored i-frame data from pre-initialization buffer 114. In turn, video decoding engine 110 may store the next-received i-frame to pre-initialization buffer 114.

In some instances, video decoding engine 110 may replace a stale i-frame with a fresh i-frame, i.e., later received i-frame, in pre-initialization buffer 114. For instance, if video decoding engine 110 detects a subsequent i-frame based on the payload analysis of this disclosure, then video decoding engine 110 may cache the fresh i-frame by storing the fresh i-frame to pre-initialization buffer 114. In this way, video decoding engine 110 may maintain a viable i-frame in pre-initialization buffer 114, provided that a currently valid i-frame was received at receiving UE 44 over channel 46. According to aspects of this disclosure, pre-initialization buffer 114 may be configured such that the storage capacity is at least as large as the maximum size of an i-frame defined according to the H.264 or H.265 standard and/or the maximum i-frame size supported by receiving UE 44. Pre-initialization buffer 114 may be implemented as part of non-volatile memory or volatile memory of receiving UE 44, such as in RAM or in long-term storage. The capacity of pre-initialization buffer 114 is referred to herein as being at least of 'x' kilobytes (Kb), where 'x' denotes the maximum i-frame size supported by receiving UE 44, expressed in Kb.

In some cases, video decoding engine 110 may replace a presently-cached i-frame in pre-initialization buffer 114, even if video decoding engine 110 does not determine that the presently-cached i-frame has become stale. For instance, if video decoding engine 110 detects that receiving UE 44 has received a more recent i-frame than the presently-cached i-frame, then video decoding engine may preempt the timer for the presently-cached i-frame, and replace the presently-cached i-frame by storing the more recently-received i-frame to pre-initialization buffer 114. Video decoding engine 110 may determine the comparative recency of a presently-cached i-frame and the subsequently-received i-frame by comparing timestamp data of the packets carrying the presently cached i-frame and the subsequently received i-frame, i.e., determine how recently the presently cached i-frame was received relative to the subsequently received i-frame.

If video decoding engine 110 determines that the subsequently-received i-frame was generated prior to the presently-cached i-frame, then video decoding engine 110 determines that the subsequently-received i-frame is a more recent i-frame, and should be used for replacement. Conversely, if video decoding engine 110 determines that the subsequently-received i-frame was generated prior to the presently-cached i-frame, then video decoding engine 110 may discard the subsequently-received i-frame, and maintain the presently-cached i-frame in pre-initialization buffer 114 until video decoder 110 determines that the presently-cached i-frame has become stale. A subsequently-received i-frame may have a prior timestamp than the presently-cached i-frame in instances of network congestion over channel 46 or in cases of other signaling abnormalities or anomalies.

According to the techniques of this disclosure, once decoder initialization is complete for video decoder 72, video decoding engine 110 may retrieve i-frame data that is presently cached in pre-initialization buffer 114, if at all any i-frame data is presently cached in pre-initialization buffer 114. In turn, video decoding engine 110 may render the retrieved i-frame data, and relay the rendered image to video output 78. In this way, video decoding engine 110 may implement the techniques of this disclosure to provide a rendered image for output immediately or shortly after video decoder 72 is initialized, thereby mitigating or potentially eliminating the video rendering delay associated with existing VT technology. As used herein, an "initialized state" represents a condition in which video decoder 72 can readily render video frame data. In contrast, a "pre-initialized state" represents a condition in which video decoder 72 cannot yet readily render video frame data but rather, must wait to transition into the initialized state to begin rendering video frame data.

In cases where remote UE 42 supports AVPF, video decoder 72 may implement a timer that measures the elapsed time since the retrieved i-frame was rendered. Video decoder 72 may set the timer such that the timer expires at a time that matches the time between consecutive i-frame transmissions defined by the refresh rate provided by video encoder 50. If video decoder 72 determines that the timer has expired, then video decoder 72 may cause receiving UE 44 to initiate a PLI/FIR transmission to local UE 32. For instance, video decoder 72 may instigate the PLI/FIR after a time lapse of 'z' seconds, where the variable 'z' maps to the length of time between consecutive i-frame transmissions by remote UE 42.

By implementing the techniques of this disclosure, video decoder 72 may provide several improvements over existing VT call management technology. In this way, video decoder 72 may implement the techniques of this disclosure to mitigate or potentially eliminate the lag time of existing VT video streaming, while maintaining picture precision by invoking a fresh i-frame once a cached i-frame is rendered but has become stale with respect to incoming prediction frames. Moreover, video decoder 72 may maintain the quality provided by video streams of existing VT call management technology, while providing the enhancement of lag time elimination.

Additionally, by implementing the techniques described herein, video decoder 72 may improve the user experience (UX) provided by receiving UE 44. For instance, video decoder 72 may provide rendered video data to video output 78 in such a way that video output 78 can immediately display a picture after establishing the VT call, or returning focus to the VT call during multitasking, or resuming a VT call that was placed on hold. For instance, video decoder 72 may provide rendered video data to video output 78 immediately after signaling according to the session initiation protocol (SIP) has taken place between receiving UE 44 and remote UE 42, and the other VT client (in this case, remote UE 42) has started to send the video frames over channel 46.

In cases where remote UE 42 does not support an AVPF mode, video decoder 72 may implement the techniques of this disclosure to mitigate or potentially eliminate a significant delay, which in many cases may be as long as ten seconds, before rendering the first picture frame of the VT call. In many instances according to the techniques of this disclosure, video decoder 72 enables video output 78 to provide the user(s) of receiving UE 44 with a rendered picture frame instantaneously upon session initiation.

In cases where remote UE 42 supports an AVPF mode, if video decoder 72 receives an i-frame within 'z' secs of rendering a cached i-frame, then the techniques of this disclosure enable video decoder 72 to conserve computing resources and bandwidth over channel 46. For instance, video decoder 72 may implement the techniques of this disclosure to save the overhead of requesting an i-frame by sending PLI/FIR, which video decoder 72 would be required to do according to existing VT call management technology. As such, receiving UE 44 and remote UE 42 may show a performance gain in terms of millions of instructions per second (MIPs) expended for processing and sending the extra frames, and for decoding and extra i-frame that is received subsequently and in relatively quick succession after the previous i-frame.

Figure 6:
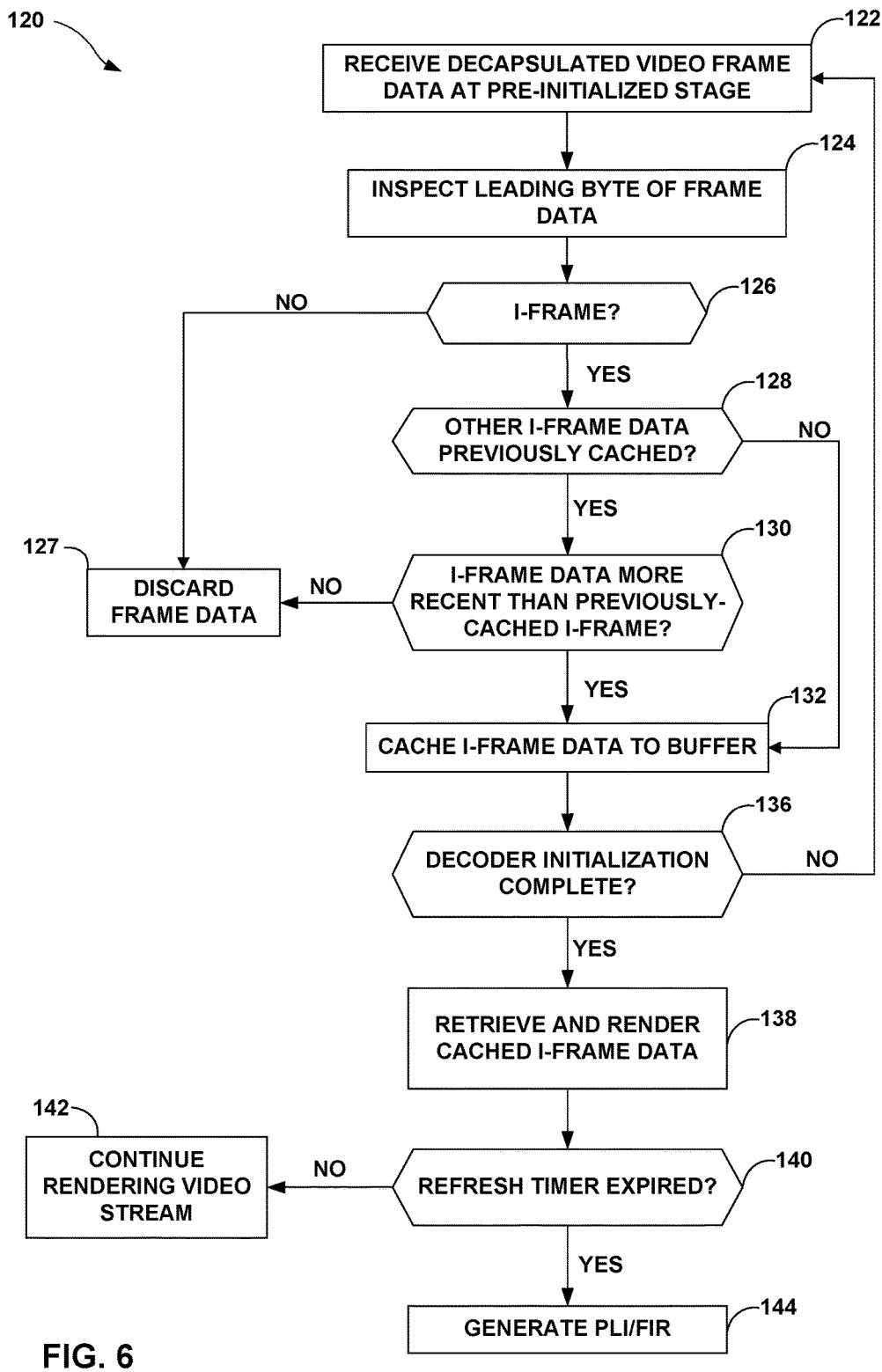
FIG. 6 is a flowchart illustrating an example process that a device may perform to implement one or more techniques of this disclosure.

FIG. 6 is a flowchart illustrating an example process 120 that receiving UE 44 may perform to implement one or more techniques of this disclosure. Process 120 represents an example in which remote UE 42 supports AVPF. Process 120 may begin when caching unit 71 receives a decapsulated packet while video decoder 72 is in a pre-initialized state (122). For instance, at a pre-initialized stage, the decoder initialization process may be incomplete or not even started with respect to video decoder 72. As such, in the pre-initialized state, video decoder 72 cannot yet render video frame data, but instead, may need to wait for a transition into an initialized state to begin rendering any video frame data available to video decoder 72. Caching unit 71 may perform further analysis on the frame data of the decapsulated packet.

For example, caching unit 71 may inspect the first, i.e., leading, byte of the received frame data (124). Based on the inspection of the first byte of the frame data, caching unit 71 may determine whether or not the frame data represents an i-frame (decision block 126). For instance, in one example, if caching unit 71 determines that the leading byte of the frame data indicates a decimal value of 128 (hexadecimal value 0x7C), then caching unit 71 determines that the received frame data represents an i-frame. Conversely, in this example, if caching unit 71 determines that the leading byte of the frame data indicates a decimal value that is different from 128 (i.e., a hexadecimal value different from 0x7C), then caching unit 71 determines that the received frame data does not represent an i-frame. If caching unit 71 determines that the received video frame data does not represent an i-frame (NO branch of decision block 126), then caching unit 71 may discard the received frame data (127).

If caching unit 71 determines that the received video frame data represents an i-frame (YES branch of decision block 126), then caching unit 71 may perform further determinative analysis. More specifically, caching unit 71 may determine whether or not other i-frame data has been previously cached (decision block 128). For instance, caching unit 71 may iterate through the contents of pre-initialization buffer 114 to determine whether pre-initialization buffer 114 contains any previously-cached i-frame data. If caching unit 71 does not locate any previously-cached i-frame data in pre-initialization buffer 114 (NO branch of decision block 128), then caching unit 71 may cache the received i-frame to pre-initialization buffer 114. If caching unit 71 locates any previously-cached i-frame data in pre-initialization buffer 114 (YES branch of decision block 128), then caching unit 71 may perform further determinative analysis.

For instance, caching unit 71 may determine whether or not the received i-frame data is more recent than the previously-cached i-frame data that was previously stored to pre-initialization buffer 114 (decision block 130). For instance, caching unit 71 may compare timestamp data associated with the received i-frame data to corresponding timestamp data associated with the previously-cached i-frame data. If the received i-frame data is not more recent than the previously-cached i-frame data (NO branch of decision block 130), then caching unit 71 may discard the received i-frame data (127).

If, on the other hand, caching unit 71 determines that the received i-frame data is more recent than the previously-cached i-frame data (YES branch of decision block 130), then caching unit 71 may cache the received i-frame data to pre-initialization buffer 114 (132). For instance, caching unit 71 may erase the previously-cached i-frame data from pre-initialization buffer 114 to free up storage capacity, provided that the previously-cached i-frame was not already erased due to staleness.

Video decoder 72 may determine whether the decoder initialization process is complete (136). If the decoder initialization is not complete, then video decoder 72 may cause caching unit 71 to continue to await decapsulated frame data (not shown in FIG. 6). If video decoder 72 determines that the initialization process is not complete (NO branch of decision block 136), then video decoder 72 may continue to receive decapsulated video frame data while in the pre-initialization stage (effectively returning to step 122). If video decoder 72 determines that the initialization process is complete (YES branch of decision block 136), then video decoder 72 may retrieve any cached i-frame data presently stored in pre-initialization buffer 114 and render the retrieved i-frame data (138). For instance, video decoder 72 may provide the rendered image data to video output 78, for display as part of a freshly-started or resumed VT call.

Additionally, video decoder 72 may implement and monitor a refresh timer that measures the time since the last i-frame was rendered. The refresh timer may be set to expire at 'z' seconds after the last i-frame was rendered. As described above, 'z' may represent an inverse of the refresh rate provided by remote UE 42, thereby indicating a time between consecutive i-frame transmissions by remote UE 42.

Video decoder 72 may determine whether or not the refresh timer has expired (decision block 140). If video decoder 72 determines that the refresh timer has not yet expired (NO branch of decision block 140), then video decoder 72 may continue rendering the video stream based off of the retrieved i-frame (142). For instance, video decoder 72 may continue rendering the video stream by rendering the retrieved i-frame itself, and by rendering subsequently received p and b inter-prediction frames by applying the delta information of the prediction frames to the i-frame data retrieved from pre-initialization buffer 114. On the other hand, if video decoder 72 determines that the refresh timer has expired (YES branch of decision block 140), then video decoder 72 may cause receiving UE 44 to generate a PLI/FIR and transmit the PLI/FIR to remote 42 (144).

In this way, receiving UE 44 represents an example of a device that is configured or otherwise operable according to aspects of this disclosure. In some examples, receiving UE 44 represents a device that includes a memory configured to store video data associated with a VT call, a video decoder configured to decode at least a portion of the stored video data, and one or more processors for processing the stored video data and operating the video decoder. Functionalities described with respect to the video decoder (e.g., video decoder 72) and/or the processor(s) of receiving UE 44 may be performed or provided by one or more digital signal processors (DSPs), general purpose microprocessors, application specific integrated circuits (ASICs), processing circuitry (e.g., programmable processing circuitry, or fixed function processing circuitry, or a combination of programmable and fixed function processing circuitry), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the terms "processor" or "processor(s)" may be provided within dedicated hardware by processing circuitry, such as programmable processing circuitry, or fixed function processing circuitry, or a combination of programmable processing circuitry and fixed function processing circuitry.

According to some examples, the processor(s) may be configured to receive video frame data over a communications channel, to determine whether the received video frame data comprises i-frame data, to determine whether the video decoder is in a pre-initialized state or an initialized state, and to store, when the received video frame data is determined to comprise the i-frame data and the video decoder is determined to be in the pre-initialized state, the i-frame data to the memory based on the determinations. In some examples, the memory implements a pre-initialization buffer. In some examples, to store the i-frame data to the memory, the processor(s) are configured to store the i-frame data to the pre-initialization buffer. In some examples, the pre-initialization buffer includes storage capacity equal to or greater than a maximum i-frame size that the device (e.g., receiving UE 44) is configured to support.

In some examples, the processor(s) are further configured to detect that the video decoder has transitioned from the pre-initialized state to the initialized state, to retrieve, based on the detected transition, the stored i-frame data from the buffer; decode the retrieved i-frame to form decoded i-frame data, and to render the retrieved i-frame data for output via a display device communicatively coupled to the video decoder. According to some examples, the processor(s) are further configured to determine whether a remote device that generated the received video frame data supports an audio video profile with feedback (AVPF) mode, to determine whether a predetermined time has elapsed since the retrieved i-frame was rendered for output via the display device, and when the predetermined time has elapsed since the retrieved i-frame was rendered for display and the remote device supports the AVPF mode, to generate an i-frame request and send the generated i-frame request to the remote device. In some examples, the processor(s) are further configured to use the retrieved i-frame data to decode and render prediction frame data associated with the VT call.

According to some examples, the stored i-frame data is associated with a first i-frame, and the processor(s) are further configured to receive, via a communication interface of the device, additional video frame data associated with a second i-frame, to determine whether the second i-frame was generated at a time more recent than a generation time of the first i-frame, and when the second i-frame was generated at a time more recent than a generation time of the first i-frame, to overwrite data associated with the first i-frame with data associated with the second i-frame in the memory. To overwrite the first (e.g., stale) i-frame, the processor(s) of receiving UE 44 may replace the stored data in the buffer with data representing the second (e.g., fresh) i-frame, in the buffer. In one example, to overwrite the stale i-frame, the processor(s) may erase the stale i-frame data from the buffer, and then store the fresh i-frame data to the buffer. In some examples, the processor(s) may overwrite the stale i-frame data using the fresh i-frame data without a dedicated erase operation In some examples, the processor(s) are further configured to determine whether a predetermined time has elapsed since the i-frame data was stored to the memory, and to determine, when the predetermined time has elapsed since the i-frame data was stored to the buffer, that the stored i-frame data is no longer usable to render the video data of the VT call. In some examples, the processor(s) are further configured to initiate, in response to receiving the video frame data, a decoder initialization process with respect to the video decoder of the device, where the decoder initialization process is configured to transition the video decoder from the pre-initialized state to the initialized state.

According to some examples, to determine whether the received video frame data comprises i-frame data, the processor(s) are further configured to decapsulate a packet that includes the video frame data to obtain a video payload of the packet, to inspect a first byte of the video payload, and to determine whether the received video frame data comprises i-frame data based on the inspected first byte. In some examples, to determine whether the received video frame data comprises i-frame data, the processor(s) are further configured to determine, if the inspected first byte indicates a decimal value of one hundred twenty eight (128), that the received video frame data comprises the i-frame data, or determine, if the inspected first byte indicates a decimal value different from one hundred twenty eight (128), that the received video frame data comprises the i-frame data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), processing circuitry (e.g., programmable processing circuitry, or fixed function processing circuitry, or a combination of programmable and fixed function processing circuitry), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software units or modules configured for encoding and decoding, or incorporated in a combined codec. Also, the techniques could be fully implemented in one or more circuits or logic elements. For instance, the techniques may be implemented by processing circuitry. Examples of processing circuitry that may implement aspects of this disclosure include programmable processing circuitry, fixed function processing circuitry, or a combination of programmable processing circuitry and fixed function processing circuitry.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video frame data of a video telephony (VT) call, the method comprising:
   receiving, at a device, the video frame data of the VT call over a communications channel;
   determining, by the device, that the received video frame data comprises i-frame data;
   determining, by the device, that a video decoder of the device is in a pre-initialized state, the pre-initialized state representing a condition in which the video decoder cannot render the received video frame data for display;
   based on the received video frame data comprising the i-frame data and the video decoder being in the pre-initialized state, storing, by the device, the i-frame data to a buffer of the device.

2. The method of claim 1, the method further comprising:
   detecting that the video decoder has transitioned from the pre-initialized state to an initialized state, the initialized state representing a condition in which the video decoder can render the received video frame data for display; and
   based on the detected transition, retrieving the stored i-frame data from the buffer of the device;
   decoding, by the video decoder, while in the initialized state, the retrieved i-frame data to form decoded i-frame data; and
   rendering, by the video decoder, while in the initialized state, the decoded i-frame data for display.

3. The method of claim 2, further comprising:
   determining that a remote device that generated the received video frame data supports an audio video profile with feedback (AVPF) mode;

determining that a predetermined time has elapsed since the retrieved i-frame data was rendered for display; and based on the predetermined time having elapsed since the retrieved i-frame data was rendered for display and the remote device supporting the AVPF mode:
generating an i-frame request, and
sending the generated i-frame request to the remote device.

4. The method of claim 2, further comprising:
using, by the video decoder, while in the initialized state, the retrieved i-frame data to decode and render prediction frame data associated with the VT call.

5. The method of claim 1, wherein a storage capacity of the buffer is equal to or greater than a maximum i-frame size that the device is configured to support.

6. The method of claim 1, wherein the stored i-frame data is first i-frame data associated with a first i-frame, the method further comprising:
receiving, at the device, additional video frame data comprising second i-frame data associated with a second i-frame;
determining that the second i-frame was generated at a time more recent than a generation time of the first i-frame; and
based on the second i-frame having been generated at a time more recent than the generation time of the first i-frame,
overwriting, in the buffer, the first i-frame data with the second i-frame data.

7. The method of claim 1, further comprising:
determining that a predetermined time has elapsed since the i-frame data was stored to the buffer; and
based on the predetermined time having elapsed since the i-frame data was stored to the buffer, determining that the stored i-frame data is no longer usable by the video decoder to render the video frame data of the VT call.

8. The method of claim 1, further comprising:
in response to receiving the video frame data of the VT call, initiating a decoder initialization process with respect to the video decoder of the device, wherein the decoder initialization process is configured to transition the video decoder from the pre-initialized state to an initialized state, the initialized state representing a condition in which the video decoder can render the received video frame data for display.

9. The method of claim 1, wherein determining that the received video frame data comprises the i-frame data comprises:
decapsulating a packet that includes the video frame data to obtain a video payload of the packet;
inspecting a first byte of the video payload; and
determining that the received video frame data comprises i-frame data based on the inspected first byte.

10. The method of claim 9, wherein determining that the received video frame data comprises the i-frame data comprises:
determining, based on the inspected first byte indicating a decimal value of one hundred twenty eight (128), that the received video frame data comprises the i-frame data.

11. A device comprising:
a communication interface configured to receive, over a communications channel, video frame data of a video telephony (VT) call;
a memory;
a video decoder in communication with the memory; and
one or more processors in communication with the memory and the video decoder, the one or more processors being configured to:
determine that the video frame data received by the communication interface comprises i-frame data;
determine that the video decoder is in a pre-initialized state, the pre-initialized state representing a condition in which the video decoder cannot render the received video frame data for display; and
store, based on the video frame data received by the communication interface comprising the i-frame data and the video decoder being in the pre-initialized state, the i-frame data to the memory.

12. The device of claim 11, wherein the memory implements a pre-initialization buffer, and wherein to store the i-frame data to the memory, the one or more processors are configured to store the i-frame data to the pre-initialization buffer.

13. The device of claim 12, wherein the pre-initialization buffer includes storage capacity equal to or greater than a maximum i-frame size that the device is configured to support.

14. The device of claim 11, wherein the device further comprises a display, and wherein the one or more processors are further configured to:
detect that the video decoder has transitioned from the pre-initialized state to an initialized state, the initialized state representing a condition in which the video decoder can render, for display, the video frame data received by the communication interface;
retrieve, based on the detected transition, the stored i-frame data from the memory; and
cause the video decoder to:
decode the retrieved i-frame data to form decoded i-frame data, and
render the decoded i-frame data for output via the display.

15. The device of claim 14, wherein the one or more processors are further configured to:
determine that a remote device that generated the received video frame data supports an audio video profile with feedback (AVPF) mode;
determine that a predetermined time has elapsed since the retrieved i-frame was rendered for output via the display device; and
based on the predetermined time having elapsed since the retrieved i-frame data was rendered for display and the remote device supporting the AVPF mode:
generate an i-frame request, and
send, via the communication interface, the generated i-frame request to the remote device.

16. The device of claim 14, wherein the video decoder is configured to:
use, while in the initialized state, the retrieved i-frame data to decode and render prediction frame data associated with the VT call.

17. The device of claim 11, wherein the stored i-frame data is first i-frame data associated with a first i-frame, wherein the communication interface is configured to receive, via the communications channel, additional video frame data comprising second i-frame data associated with a second i-frame, and wherein the one or more processors are further configured to:
determine that the second i-frame was generated at a time more recent than the generation time of the first i-frame; and based on the second i-frame having been generated at a time more recent than a generation time of the first i-frame, overwrite, in the memory, the first i-frame data with the second i-frame data.

18. The device of claim 11, wherein the one or more processors are further configured to:
    determine that a predetermined time has elapsed since the i-frame data was stored to the memory; and
    based on the predetermined time having elapsed since the i-frame data was stored to the memory, determine that the stored i-frame data is no longer usable by the video decoder to render the video frame data of the VT call.

19. The device of claim 11, wherein the one or more processors are further configured to:
    initiate, in response to the communication interface receiving the video frame data of the VT call, a decoder initialization process with respect to the video decoder of the device, wherein the decoder initialization process is configured to transition the video decoder from the pre-initialized state to an initialized state, the initialized state representing a condition in which the video decoder can render, for display, the video frame data received by the communication interface.

20. The device of claim 11, wherein to determine that the video frame data received by the communication interface comprises the i-frame data, the one or more processors are further configured to:
    decapsulate a packet that includes the video frame data to obtain a video payload of the packet;
    inspect a first byte of the video payload; and
    determine, based on the inspected first byte, that the video frame data received by the communication interface comprises the i-frame data.

21. The device of claim 20, wherein to determine that the received video frame data comprises the i-frame data, the one or more processors are further configured to:
    determine, based on the inspected first byte indicating a decimal value of one hundred twenty eight (128), that the received video frame data comprises the i-frame data.

22. An apparatus for processing video frame data of a video telephony (VT) call, the apparatus comprising:
    means for receiving the video frame data of the VT call over a communications channel;
    means for determining that the received video frame data comprises i-frame data;
    means for determining that a video decoder of the apparatus is in a pre-initialized state, the pre-initialized state representing a condition in which the video decoder cannot render the received video frame data for display; and
    means for storing, based on the received video frame data comprising the i-frame data and the video decoder being in the pre-initialized state, the i-frame data to a buffer of the apparatus.

23. The apparatus of claim 22, further comprising:
    means for detecting that the video decoder has transitioned from the pre-initialized state to an initialized state, the initialized state representing a condition in which the video decoder can render the received video frame data for display;
    means for retrieving, based on the detected transition, the stored i-frame data from the buffer of the apparatus;
    means for decoding, while the video decoder is in the initialized state, based on the detected transition, the retrieved i-frame data to form decoded i-frame data; and
    means for rendering, while the video decoder is in the initialized state, based on the detected transition, the decoded i-frame data for display.

24. The apparatus of claim 23, further comprising:
    means for determining that a remote device that generated the received video frame data supports an audio video profile with feedback (AVPF) mode;
    means for determining that a predetermined time has elapsed since the retrieved i-frame data was rendered for display;
    means for generating, based on the predetermined time having elapsed since the retrieved i-frame data was rendered for display and the remote device supporting the AVPF mode, an i-frame request; and
    means for sending the generated i-frame request to the remote device over the communications channel.

25. The apparatus of claim 23, further comprising:
    means for using the retrieved i-frame data to decode and render prediction video frame data associated with the VT call while the video decoder is in the initialized state.

26. The apparatus of claim 22, wherein a storage capacity of the buffer is equal to or greater than a maximum i-frame size that the device is configured to support.

27. A non-transitory computer-readable storage medium encoded with instructions that, when executed, cause one or more processors of a device for processing video frame data of a video telephony (VT) call to:
    receive the video frame data of the VT call over a communications channel;
    determine that the received video frame data comprises i-frame data;
    determine that a video decoder of the device is in a pre-initialized state, the pre-initialized state representing a condition in which the video decoder cannot render the received video frame data for display; and
    based on the received video frame data comprising the i-frame data and the video decoder being in the pre-initialized state, store the i-frame data to a buffer of the device.

28. The non-transitory computer-readable storage medium of claim 27, wherein the stored i-frame data is first i-frame data associated with a first i-frame, further encoded with instructions that, when executed, cause the one or more processors of the device to:
    receive, via a communication interface, additional video frame data comprising second i-frame data associated with a second i-frame;
    determine that the second i-frame was generated at a time more recent than a generation time of the first i-frame; and
    based on the second i-frame having been generated at a time more recent than the generation time of the first i-frame, overwrite, in the buffer of the device, the first i-frame data with the second i-frame data.

29. The non-transitory computer-readable storage medium of claim 27, further encoded with instructions that, when executed, cause the one or more processors of the device to:
    determine that a predetermined time has elapsed since the i-frame data was stored to the memory; and
    based on the predetermined time having elapsed since the i-frame data was stored to the buffer, determine that the stored i-frame data is no longer usable by the video decoder to render the video data of the VT call.

30. The non-transitory computer-readable storage medium of claim 27, further encoded with instructions that, when executed, cause the one or more processors of the device to:

initiate, in response to receiving the video frame data, a decoder initialization process with respect to the video decoder of the device, wherein the decoder initialization process is configured to transition the video decoder from the pre-initialized state to an initialized state, the initialized state representing a condition in which the video decoder can render the received video frame data for display.

* * * * *